United States Patent
Patel et al.

(10) Patent No.: US 9,106,471 B2
(45) Date of Patent: Aug. 11, 2015

(54) METHOD AND APPARATUS FOR PROVIDING AN ENHANCED ZERO-IF RECEIVER ARCHITECTURE FOR A WIRELESS COMMUNICATIONS SYSTEM

(71) Applicants: Kumud Patel, Germantown, MD (US);
Sachin Lal, Clarksburg, MD (US);
Minheng Shan, Rockville, MD (US);
Mark Steber, Frederick, MD (US)

(72) Inventors: Kumud Patel, Germantown, MD (US);
Sachin Lal, Clarksburg, MD (US);
Minheng Shan, Rockville, MD (US);
Mark Steber, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/027,379

(22) Filed: Sep. 16, 2013

(65) Prior Publication Data

US 2014/0177761 A1    Jun. 26, 2014

Related U.S. Application Data

(60) Provisional application No. 61/702,067, filed on Sep. 17, 2012.

(51) Int. Cl.
*H04L 27/06*    (2006.01)
*H04L 25/00*    (2006.01)

(52) U.S. Cl.
CPC ............... *H04L 27/06* (2013.01); *H04L 25/00* (2013.01)

(58) Field of Classification Search
CPC ..................................................... H04L 27/06
USPC ............. 375/340, 316, 261; 455/255, 67.14, 455/67.11
See application file for complete search history.

(56) References Cited

U.S. PATENT DOCUMENTS

| | | | | |
|---|---|---|---|---|
| 7,187,725 | B2 * | 3/2007 | Song et al. | 375/316 |
| 7,570,923 | B2 | 8/2009 | Kiss et al. | |
| 8,842,771 | B2 * | 9/2014 | Da Silva | 375/296 |
| 2002/0065060 | A1 | 5/2002 | Minnis et al. | |
| 2005/0008107 | A1 * | 1/2005 | Brown | 375/343 |
| 2007/0109180 | A1 * | 5/2007 | Charpentier et al. | 342/174 |
| 2008/0057899 | A1 | 3/2008 | Montemayor et al. | |
| 2008/0159453 | A1 | 7/2008 | Smith | |
| 2008/0165874 | A1 | 7/2008 | Steele et al. | |
| 2008/0273608 | A1 * | 11/2008 | Jonsson | 375/260 |
| 2011/0150131 | A1 * | 6/2011 | Kang et al. | 375/296 |

FOREIGN PATENT DOCUMENTS

EP    0305164 A2    3/1989

OTHER PUBLICATIONS

"International Search Report & Written Opinion", International Search Report & Written Opinion, PCT/US2013/059875, Jan. 3, 2014.

* cited by examiner

*Primary Examiner* — Shuwang Liu
*Assistant Examiner* — Helene Tayong
(74) *Attorney, Agent, or Firm* — Potomac Technology Law, LLC

(57) ABSTRACT

An approach includes injecting a plurality of equal amplitude tones across a frequency band. The approach also includes determining frequency response based on the injected tones, determining an imbalance parameter associated with a quadrature down-converter based on the determined frequency response; determining one or more parameters for wideband quadrature compensation based on the determined frequency response, and compensating an input signal based on the determined imbalance parameter and the determined one or more parameters for the wideband quadrature compensation.

19 Claims, 22 Drawing Sheets

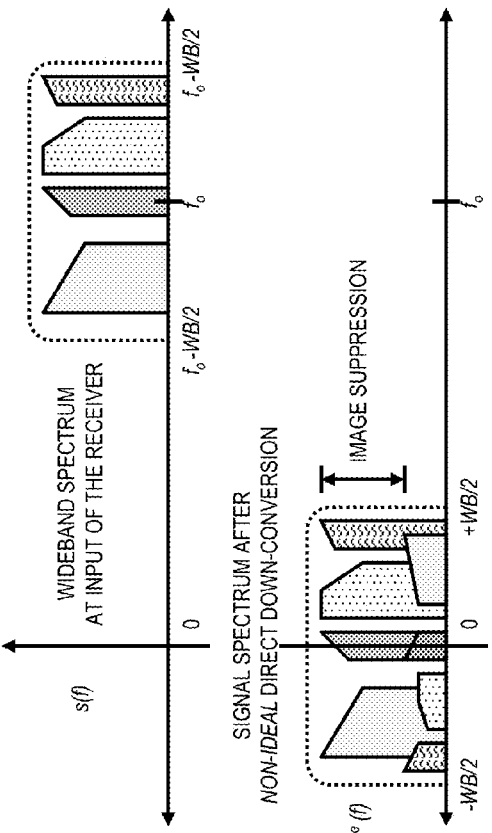
FIG. 6A
FIG. 6B
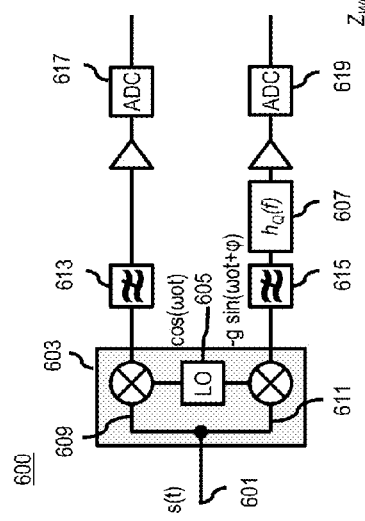
FIG. 6C
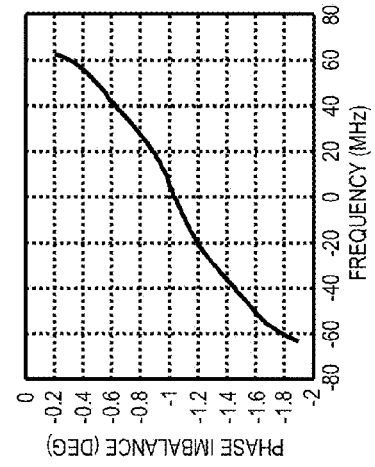
FIG. 6D
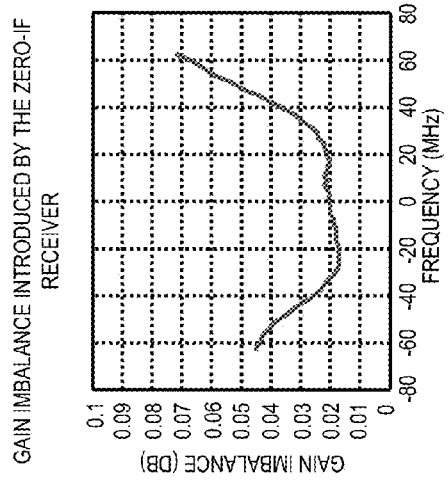

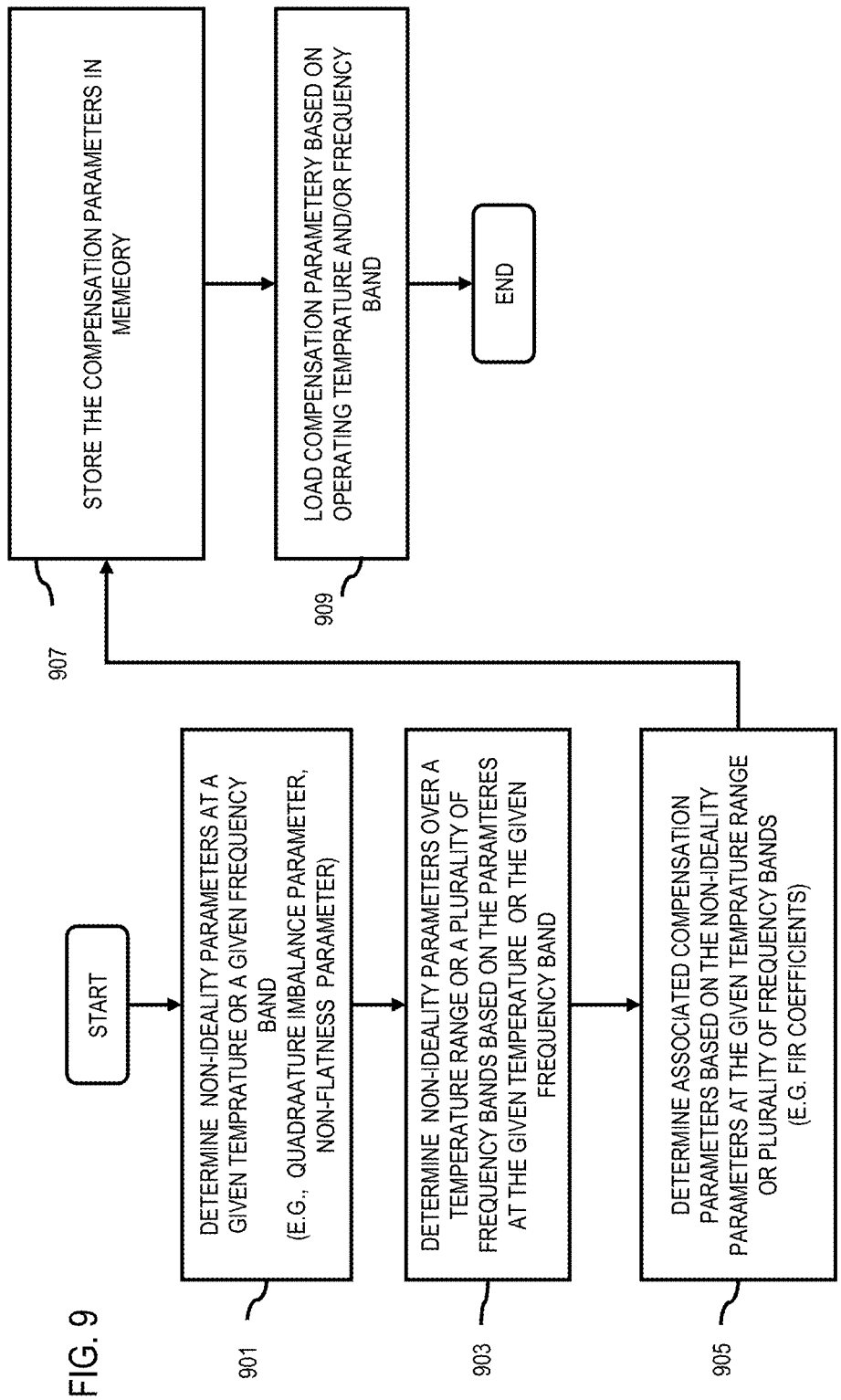

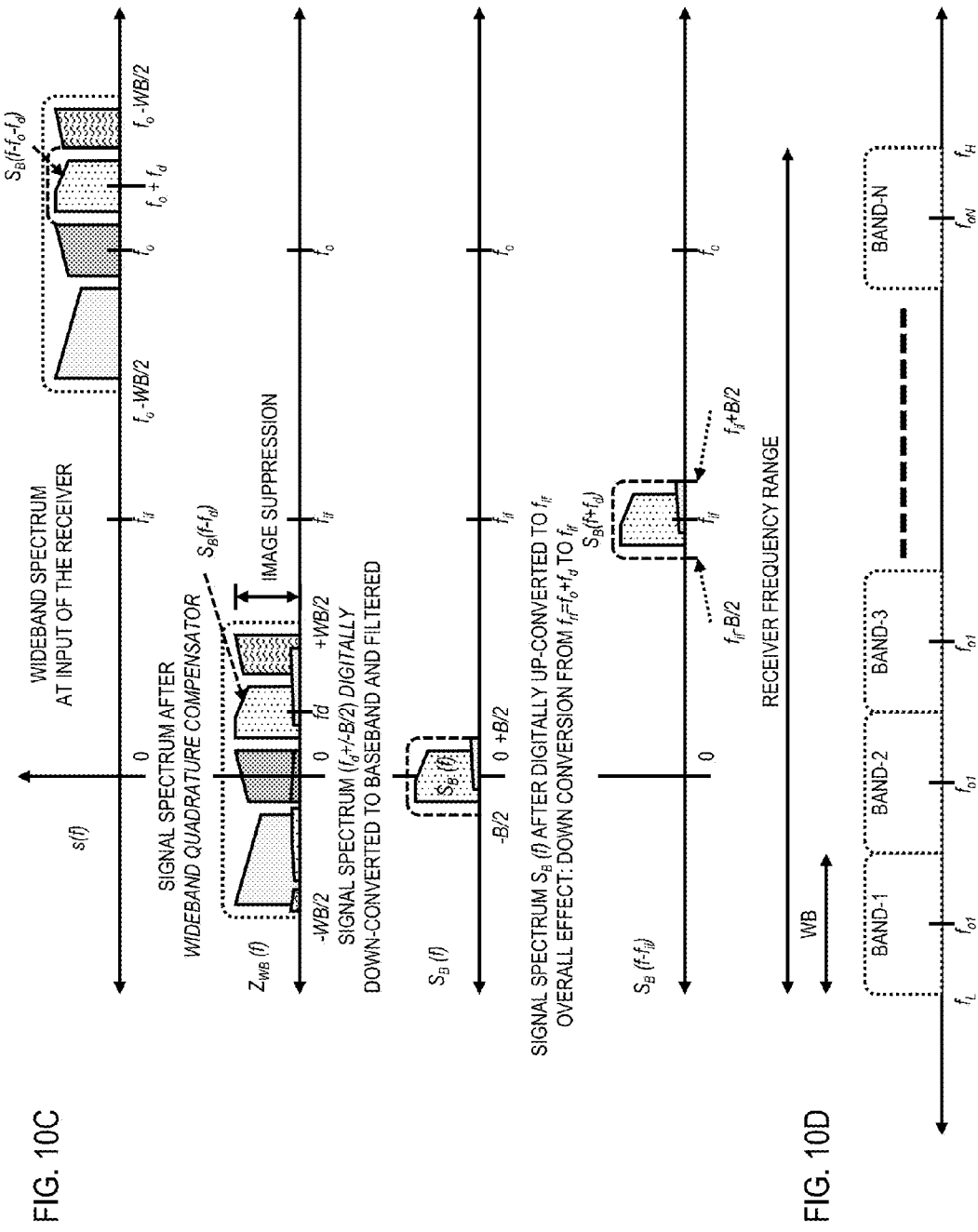

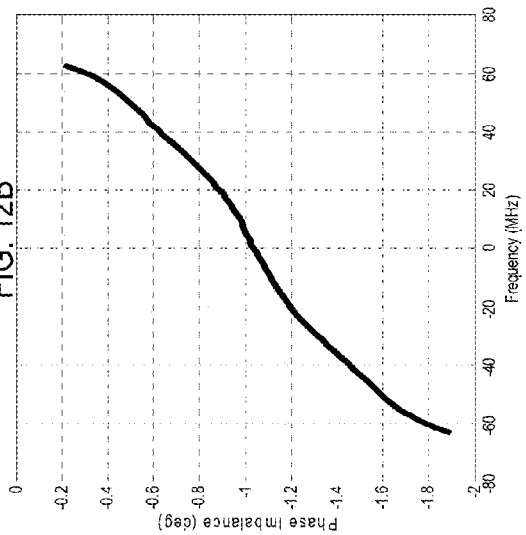
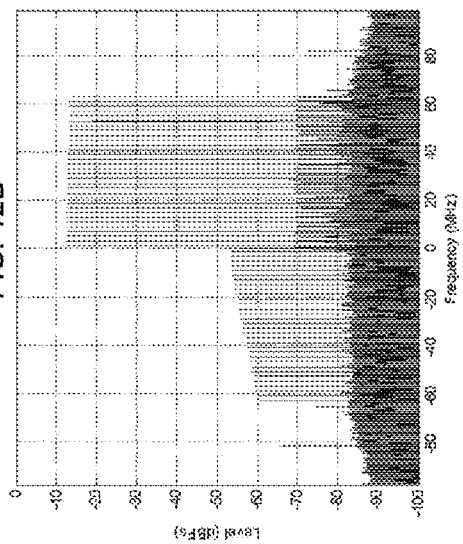
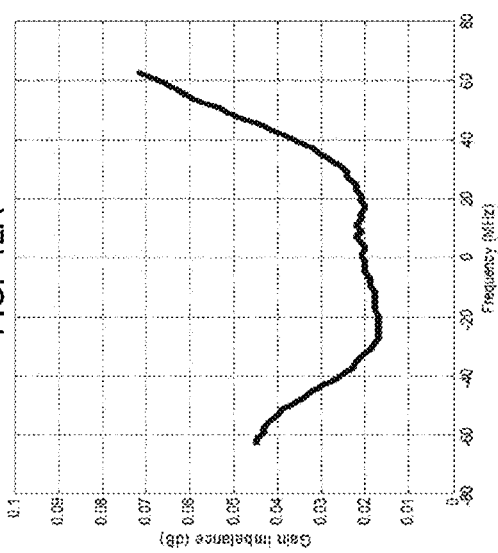
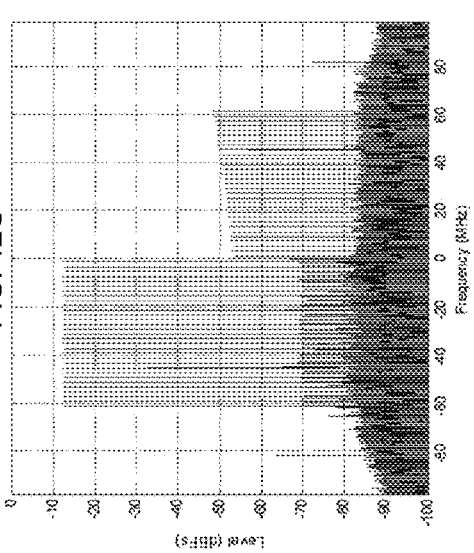
FIG. 12A
FIG. 12B
FIG. 12C
FIG. 12D

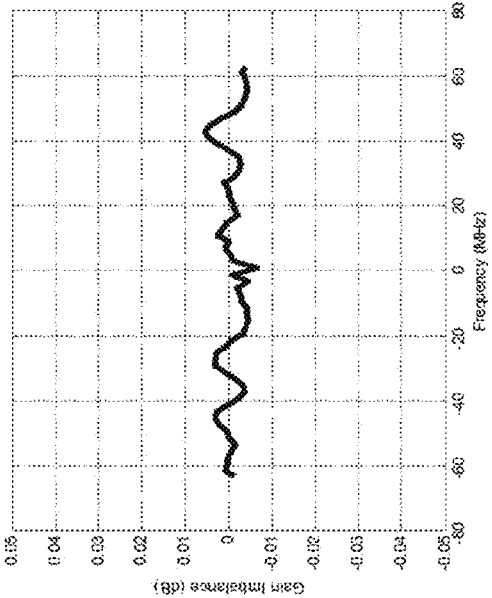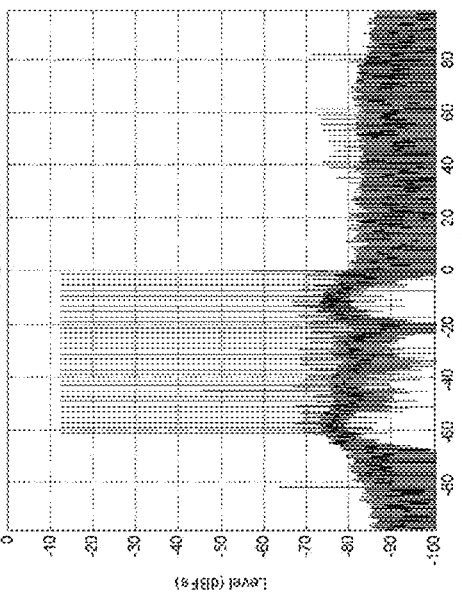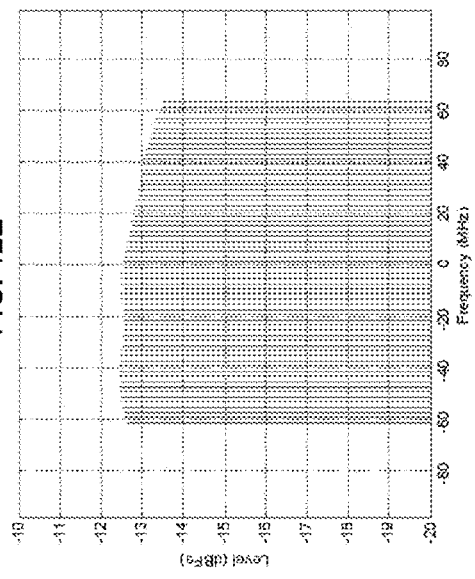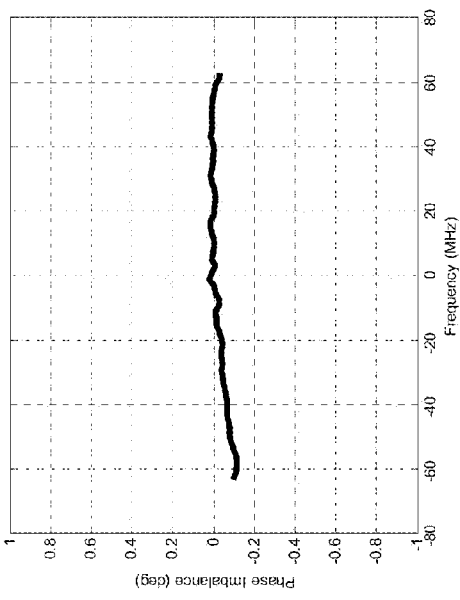

METHOD AND APPARATUS FOR PROVIDING AN ENHANCED ZERO-IF RECEIVER ARCHITECTURE FOR A WIRELESS COMMUNICATIONS SYSTEM

RELATED APPLICATIONS

This application claims the benefit of the earlier filing date under 35 U.S.C. §119(e) of U.S. Provisional Application Ser. No. 61/702,067 (filed 17 Sep. 2012), the entirety of which is incorporated herein by reference.

BACKGROUND INFORMATION

Radio Frequency (RF) receivers are ubiquitous in all aspects of modern communications systems (e.g., cellular, satellite, wireless networks, etc.). The zero-IF (Intermediate Frequency) is a design methodology which greatly simplifies the RF receiver compared with the traditional superheterodyne designs. In zero-IF receiver the RF signal is directly down-converted to baseband using a quadrature down-converter. The output of the quadrature down-converter are two in-phase/quadrature (I/Q) components; and it is crucial to have the quadrature components I/Q balanced so that no image signal is present in the baseband when the components are combined. In practice, designing a balanced quadrature down-converter can be challenging due to, e.g., device mismatches, non-ideal components, temperature effects, etc. A common approach to combat the imbalances has been to use quadrature compensators, which compensate for imbalances by applying phase, gain, DC corrections. However, these methods are not able to remove imbalances across the entire frequency bandwidth; accordingly, RF zero-IF receivers suffer from performance degradation.

Conventional zero-IF receiver designs have dealt with a single channel or a single carrier. These designs experience performance degradation due to quadrature imbalance, channel flatness and variation over the operating temperature. In some cases, the degradation due to the impairments is compensated on per carrier basis. A main drawback of this approach is that it is a single channel/carrier design. This, it has to be replicated many times to achieve multi-channel/carrier receiver. Also, it cannot be used as a frequency conversion device.

Therefore, there is a need to design enhanced zero-IF receivers in which imbalances in quadrature components are compensated for completely. Different embodiments address these deficiencies and others in the design of zero-IF receivers and result in significantly improved RF receivers with robust performance across a large frequency band in a variety of systems such as multi-channel and multi-carrier systems and across wide range of operational conditions (e.g., temperature variations).

SOME EXEMPLARY EMBODIMENTS

The present invention, according to various embodiments, advantageously addresses the needs above, as well as other needs, by, inter alia, providing a zero-IF receiver in which the quadrature imbalances are compensated by a wideband quadrature compensator. Furthermore, the non-flatness of the frequency response is compensated to enhance the receiver performance.

According to an exemplary embodiment, a method includes injecting a plurality of equal amplitude tones across a frequency band, and determining one or more frequency responses based on the injected tones. An imbalance parameter associated with a quadrature down-converter is determined based on the determined one or more frequency responses, and one or more parameters for wideband quadrature imbalance compensation are determined based on the determined one or more frequency response. An input RF signal is down-converted by the quadrature down-converter, a DC off-set compensation of the I and Q components of an intermediate signal is provided, wherein the intermediate signal represents in-phase (I) and quadrature (Q) components of the quadrature down converter, and the intermediate signal is compensated based on the determined one or more parameters for wideband quadrature compensation. Further, certain embodiments provide corrections for the impairments over wide band and temperature range, and results in a compact solution for receiving and demodulating multiple channels/carriers on a single card. Additionally, certain embodiments provide high performance wideband multi-channel/multi-carrier receiver. By way of example, some embodiments provide wideband multi-channel/multi-carrier zero-IF receivers with a technique that improves performance and permits more applications over large operational frequency and temperature range. In some embodiments, wideband quadrature correction, wideband flatness correction, and a complex down/up conversion are provided.

According to an exemplary embodiment, an apparatus comprises: a quadrature down-converter configured to down-convert an input RF signal; a DC offset compensator configured to compensate DC offset in in-phase (I) and quadrature (Q) components of an intermediate signal representing the I/Q components of the quadrature down-converter; and a wideband imbalance compensator configured to compensate wideband imbalance in the I/Q components of the intermediate signal based at least in part on one or more imbalanced compensation parameters. The one or more imbalanced compensation parameters are determined based in part on injecting a plurality of equal amplitude tones across a frequency band, determining one or more frequency responses based on the injected tones, determining an imbalance parameter associated with the quadrature down-converter based on the determined one or more frequency responses, and determining one or more imbalanced compensation parameters based on the determined one or more frequency responses.

Advantageously, various embodiments enable multiple applications including, for example: a single channel/carrier receiver—narrowband as well as wideband, a multi-channel/multi-carrier receiver, unrestricted placement of the channel/carrier within the processed bandwidth, or a wideband frequency conversion to desired intermediate frequency.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6A-6D illustrate a model capturing the non-ideal nature of the quadrature down-converter, in accordance with various embodiments;

FIG. 9 is a flowchart of a process for calibrating and determining the wideband quadrature compensator parameters or the flatness compensator parameters over a temperature range or a plurality of frequency bands, according to certain embodiments;

FIGS. 10C-10D illustrate the image suppression and different overlapping or non-overlapping channels in the receiver, according to certain embodiments;

DETAILED DESCRIPTION

A system, apparatus, and methods for receiving RF signal are presented, in particular enhanced zero-IF receivers are disclosed wherein quadrature imbalances and other undesirable deficiencies are mitigated and compensated for significantly. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
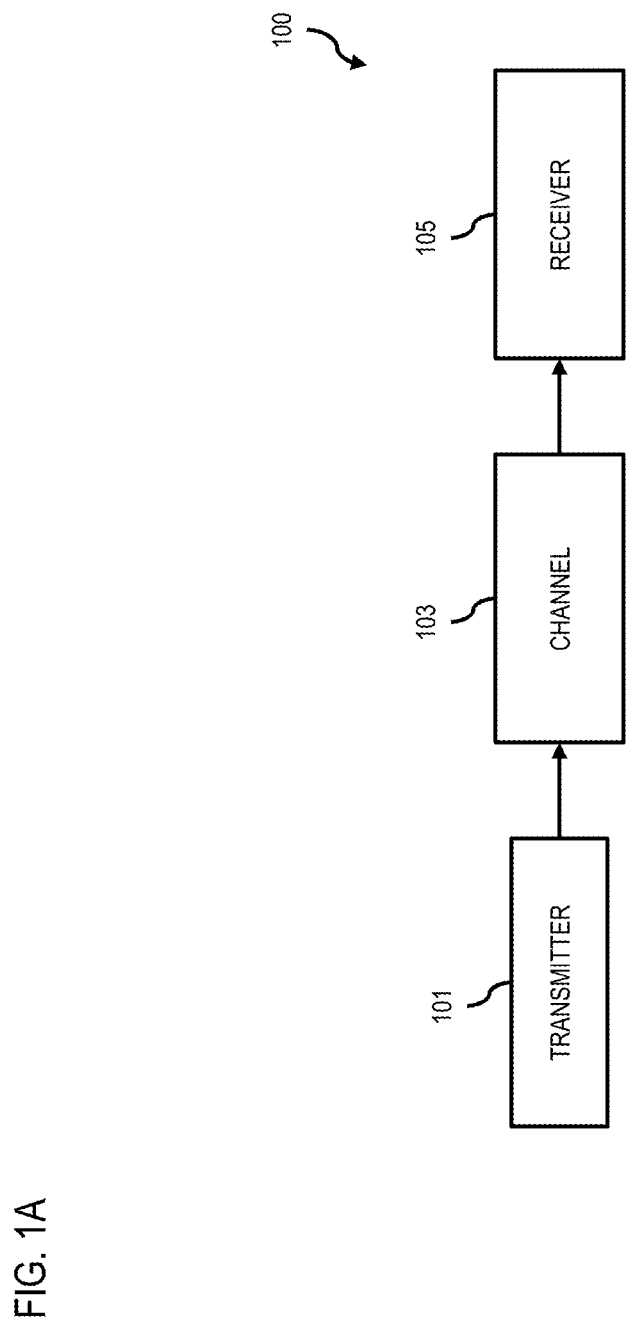
FIG. 1A illustrates a broadband communications system capable of employing a zero-IF RF receiver.

FIG. 1 schematically illustrates communications systems capable of employing the invented zero-IF RF receiver, according to an embodiment. With reference to FIG. 1A, a broadband communications radio frequency system 100 includes one or more transmitters 101 (of which one is shown) that generate signal waveforms across a communications channel 103 to one or more receivers 105 (of which one is shown). The transmitted signal waveforms are attenuated, or otherwise altered, by communications channel 103. Various coding may be utilized to combat noise and other issues associated with the channel, such as forward error correction (FEC) codes. It is contemplated that various modulation schemes and source/channel coding techniques can be employed. The enhanced zero-IF receiver 105 is capable of achieving low error rates despite non-ideal characteristics inherent in circuits and various technologies.

Figure 1B:
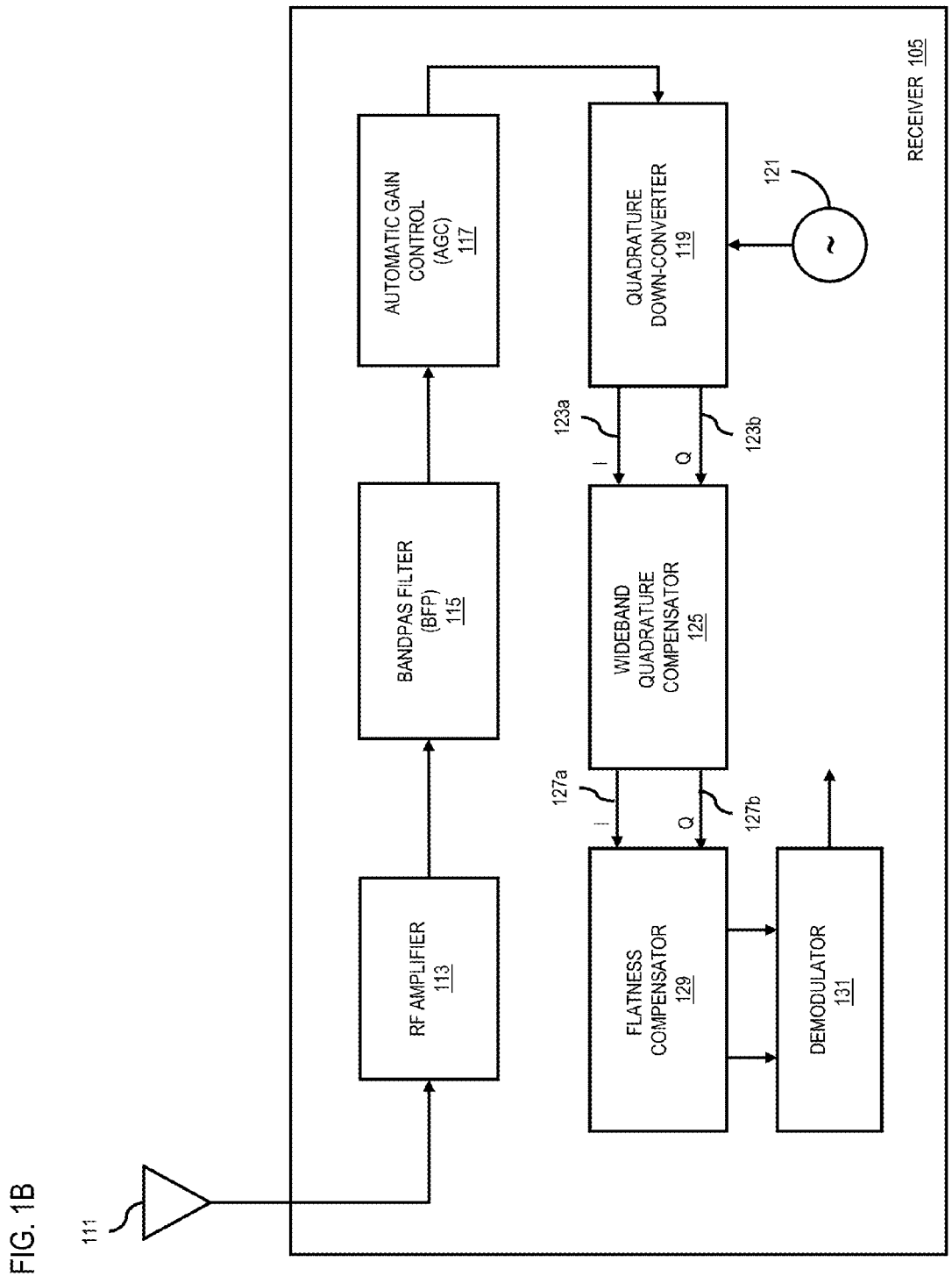
FIG. 1B depicts a diagram of an enhanced zero-IF RF receiver wideband zero-IF RF receiver employing a Wideband Quadrature Imbalance Compensator or simply Wideband Quadrature Compensator (WQC) and a flatness compensators, in accordance with various embodiments.

FIG. 1B schematically depicts a zero-IF RF receiver, according to one embodiment. The RF receiver 105 is comprised of an antenna 111 to receive RF signals. A received RF signal then is passed through some preliminary processing steps; e.g., RF amplifier 113, Band Pass Filter (BPF) 115, and an automatic gain controller (AGC) 117. In the next stage, the amplified and filtered signal is down-converted to zero IF frequency using the complex quadrature down-converter 119. The frequency of the local oscillator 121 driving the down-converter 119 is, e.g., determined based on the carrier frequency of the received RF signal. The outputs of the down-converter 119 are the two I and Q components 123a and b, respectively. It is observed that the two I/Q components suffer from imbalances across frequency band; as such, this could negatively affect the performance of the receiver 105. The imbalances could be the result of non-ideal device mismatches. Hence, in the next stage, the Wideband Quadrature Compensator (WQC) 125 is employed, whereby the I/Q components are passed through the compensator 125. The compensator WQC is designed so that it can remove the imbalances across the entire bandwidth of the signal, and thereby result in excellent image suppression at the zero-IF signal. The structure of the WQC 125 is explained further below in detail.

In this manner, the output I/Q components 127a and 127b are substantially balanced. However, these I/Q components 127a and 127b might still suffer from non-flatness across frequency band resulting from the frequency response of the receiver circuit/implementation due to non-ideal characteristics. Hence, in some embodiments, another stage of compensation is performed by the Flatness Compensator 129, which compensates for the non-flatness of the frequency response of the receiver 105. It is contemplated that in some embodiments, the compensators 125 and 129 can be combined.

In some other embodiments, the I/Q components 127 can be combined before being fed to the flatness compensator 129. It is contemplated that rest of the RF receiver can be implemented according to any existing or future design architectures. For example the demodulator 131 may be any known demodulator (e.g., digital/analog, AM, FM, QAM, etc.) employed to recover the transmitted data. Moreover, in the case of a multi-channel/multicarrier systems, it is contemplated that a channelizer may be used to channelize the compensated signal to channels or corresponding carriers and the needed demodulation may be applied to each channel/carrier thereof. Moreover, it is contemplated that any form of up or down conversion could be employed to give further flexibility in frequency tuning and signal placement.

Figure 2:
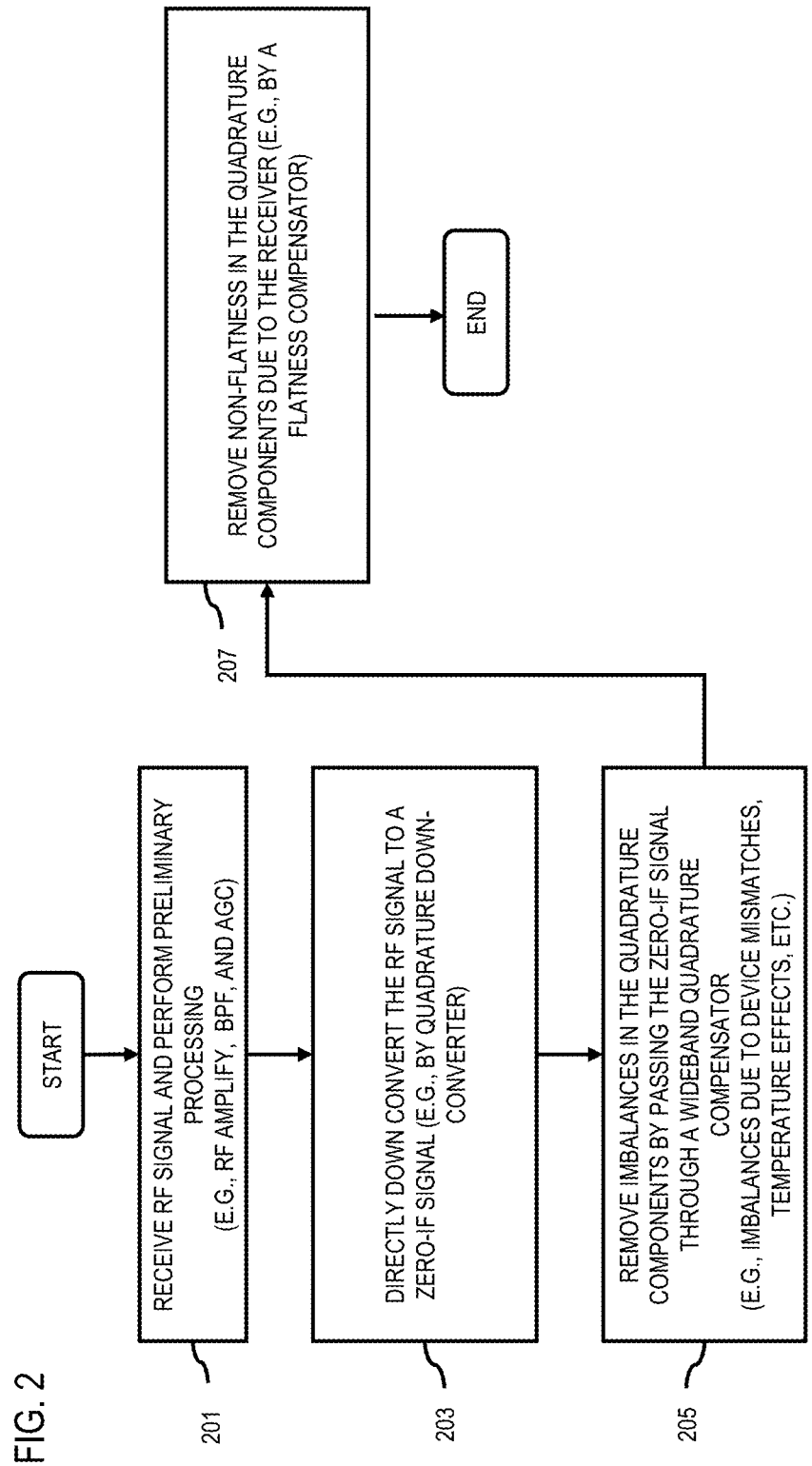
FIG. 2 illustrates a flowchart of the operation of the receiver of FIG. 1B, in accordance with an embodiment.

FIG. 2 depicts the flowchart of the operation of the RF receiver, according to one embodiment. In step 201, an RF signal is received; and preliminary processing operations are performed. This includes, e.g., RF amplification, BPF or AGC. In step 203, the processed signal is directly down-converted to zero-IF using a quadrature down-converter whose output are I/Q components. Due to non-ideal characteristics, the I/Q components are not balanced; consequently, when these components are combined, the signal images at baseband are still present. Therefore, in step 205, the imbalances are removed by further passing the I/Q components through a wideband quadrature compensation (WQC). Since a WQC operates over the entire frequency bandwidth of the RF signal significant imbalance removal is achieved. As mentioned, these imbalances can stem from device mismatches in the branches of quadrature down-converter or can be due to temperature variations or other non-ideal effects.

In some embodiments, the non-flatness in the frequency response of the receiver may need to be compensated for over the frequency bandwidth of the signal. Accordingly, in step 207, an extra flatness compensation process is performed by passing the IQ components through flatness compensators (the architecture of which is explained later). It is contemplated that in some embodiments, steps 205 and 207 can be implemented using a single combined architecture.

Figure 3:
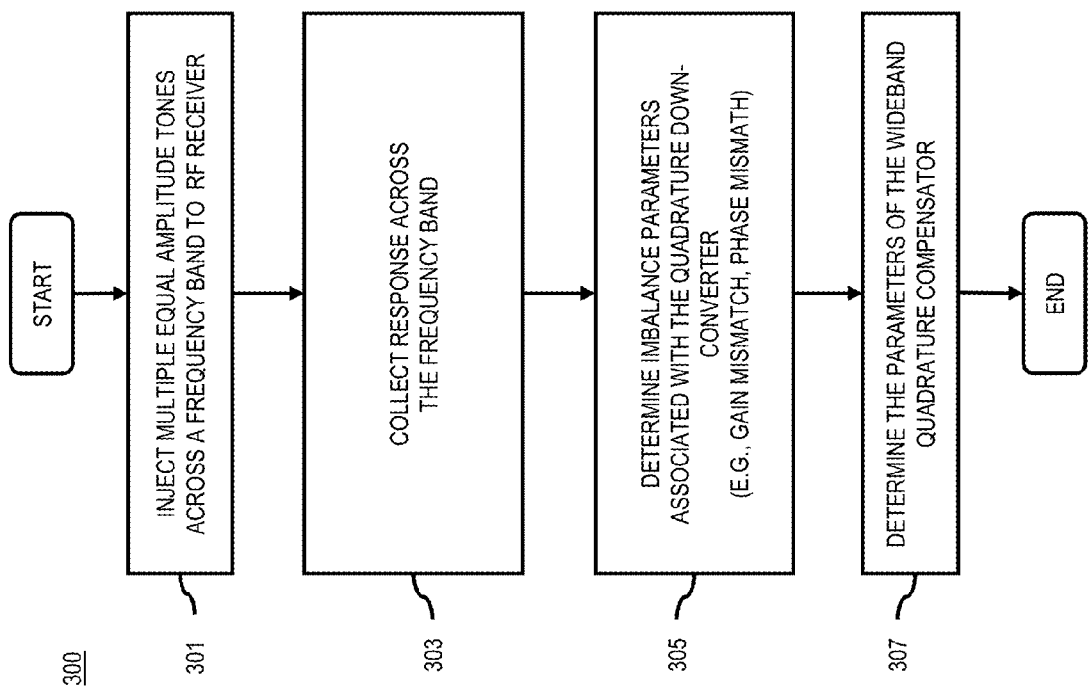
FIG. 3 is a flowchart of a process to calibrate and determine the WQC in the receiver of FIG. 1B, in accordance with an embodiment.

FIG. 3 is a flowchart of a process to calibrate and determine the WQC in the receiver of FIG. 1B, in accordance with an embodiment. In step 301, one or more equal amplitude tones across the bandwidth of the signal (i.e., desired operational bandwidth) are injected to the RF receiver. In step 303, the tones are collected and measured at the output of the quadrature down-converter 119. This, in particular, includes collecting the I/Q components 123a and b. In step 305, the imbalances in the I/Q components are determined—notably, the amplitude and phase imbalances are determined across the frequency band. The determined imbalance can be modeled as a filter $H_Q(f)$. In some embodiments, measurement of DC offset at the I/Q components is also performed. In step 307, the parameters of the WQC is determined essentially by inverting the filter $H_Q(f)$. In some embodiments, a DC removal step is contemplated by negating the DC measurements mentioned above. In step 307, various implementations are possible. For example, in some embodiments an Finite Impulse Response (FIR) inverse to filter $H_Q(f)$ is determined. In some embodiments, specific architectures can be more useful (as explained below). In other implementations Infinite Impulse Response (IIR), analog implementation, or other combinations are contemplated.

Hence, according to various embodiments, multi-carrier multi-channel RF receivers with high I/Q balancing and image rejection across a wide operational temperature range are achieved.

In some embodiments, further compensation for non-flatness of the frequency response of the receiver is contemplated using a flatness compensator 129 as in FIG. 1B.

Figure 4:
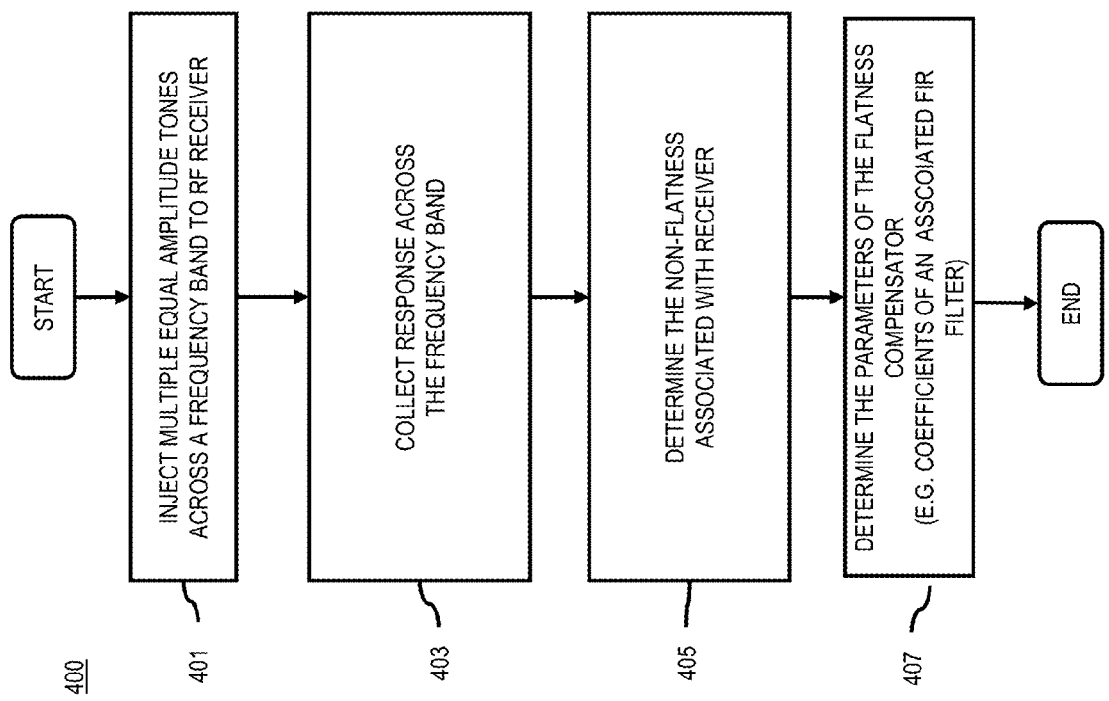
FIG. 4 is a flowchart of a process for calibrating and determining the flatness compensator in the receiver of FIG. 1B, in accordance with an embodiment.

FIG. 4 is a flowchart of a process for calibrating and determining the flatness compensator in the receiver of FIG. 1B, in accordance with an embodiment. In step 401, the RF receiver is injected with multiple tones of equal amplitude across a frequency bandwidth. In step 403, the response of the receiver is collected, e.g., at the output of the branch of the WQC 125 (e.g., the I or Q branch).

In step 405, based on the collected response, a model $H_B(f)$ for the collected frequency response (non-flat) is determined. In step 407, by essentially inverting $H_B(f)$, flatness compensation is determined. In some embodiments, an FIR inverse to $H_Q(f)$ is designed. In some embodiments, the WQC and flatness compensator can be combined to achieve less complexity of the receiver. Similar to the design of WQC (explained later), a flatness compensator can be efficiently designed across a range of temperatures or for multiple-carriers and multiple-channels.

It is contemplated that various embodiments can be implemented in various forms and combinations, such analog, DSP, software, discrete components/circuitry, and/or combinations thereof.

In certain embodiments, the injection of tones and the measurement of the I/Q imbalance or non-flatness pattern are taken over various operational temperatures or a plurality of frequency bands. It is observed, however, that e.g., to expedite the design process, injection/measurement of tones over an entire frequency band may instead be performed at a first temperature and then only a single injection /measurement is taken per each other operational temperature. It is noted that up to a very good approximation constructing the I/Q imbalance or non-flatness patterns at other temperatures is simply a matter of shifting the I/Q imbalances at the first temperature by an offset determined based on the single injection/measurement at other temperatures. Similarly, constructing I/Q imbalance patterns in multiple of carrier frequencies is also possible either by direct (or exact) injection/measurement over entire frequency band or bandwidth at each carrier frequency or by injection/measurement over entire frequency bandwidth and apply the offset shifting at other carrier frequency based on an injection/measurement at only frequency tone. In all these scenarios, upon determining the I/Q imbalance patterns an associated WQC can be determined essentially by inverting the determined filter $H_Q(f)$.

Figure 5A:
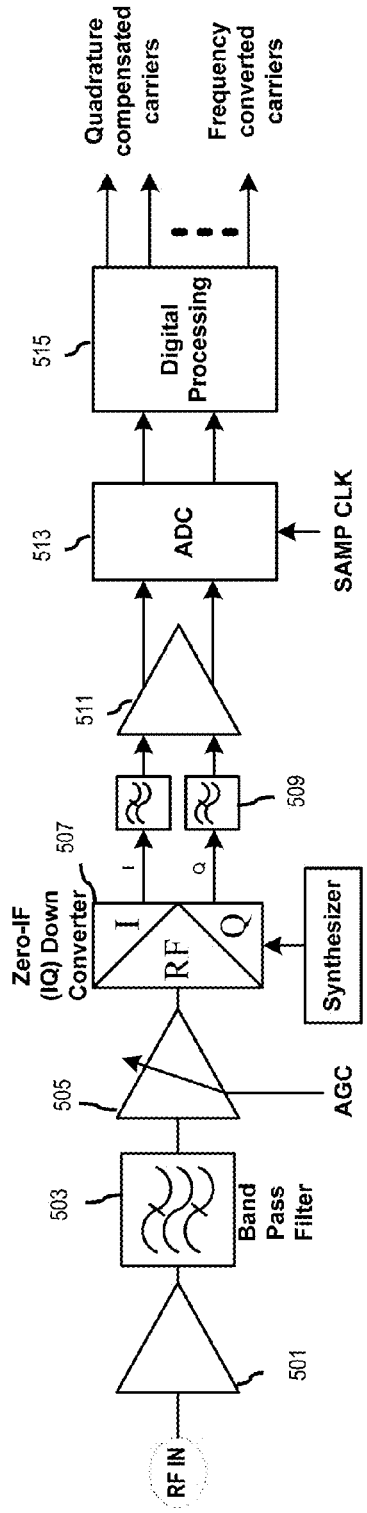
FIGS. 5A-5C illustrate a typical prior-art zero-IF RF receiver in which only a narrowband quadrature compensator is employed, in accordance with an embodiment.
Figure 5B:
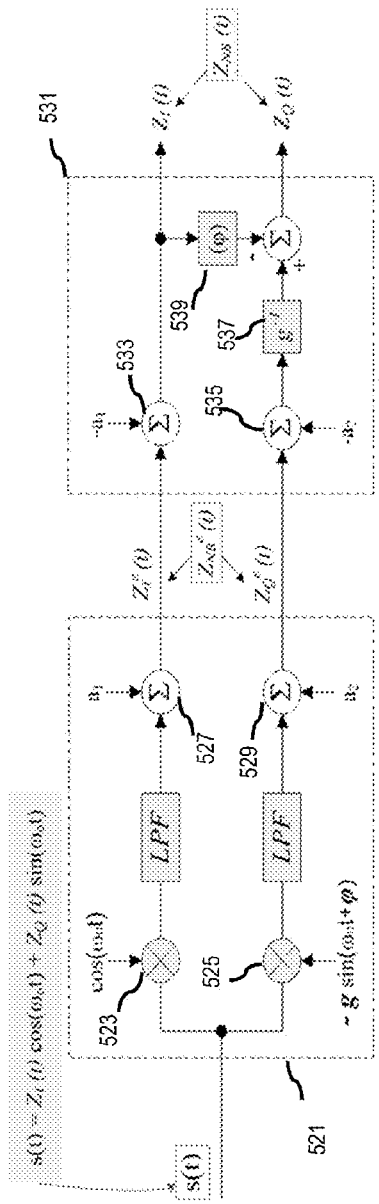

FIG. 5A shows a typical zero-IF receiver (prior art) which includes a conventional or narrowband quadrature compensator. In FIG. 5B, a conventional zero-IF quadrature down converter and narrowband compensator block diagram are depicted. This involves limited (imperfect) correction and is applicable to a narrow band channel/carrier.

As depicted, typical direct conversion receiver includes RF amplification 501, filtering 503, gain control elements 505, a complex I/Q down converter/tuner 507, followed by separate branches for the I and Q channel, containing a low pass filter (LPF) 509, gain amplifier 511, and dual-channel ADC 513. The direct conversion approach is spectrally more efficient than the low IF down conversion approach, but will suffer from imperfect image rejection, due to phase and gain imbalances between the I and Q branches. The presence of an image signal can result in a degraded Error Vector Magnitude (EVM), which in turn degrades the Bit Error Rate (BER). To mitigate this issue, narrowband quadrature compensation is performed by the digital signal processor 715. The conventional zero-IF receiver designs deal with a single channel or a single carrier. As noted, these designs experience performance degradation due to quadrature imbalance, channel flatness and variation over the operating temperature.

The top plot in FIG. 5B shows modeling of the quadrature imbalance according to various embodiments. In reality the zero-IF down converter 507 is imperfect and there will be imbalances between its I and Q branches which may be modeled as in block 521. The in-phase path (I) is multiplied with $\cos(\omega_o t)$, while the quadrature path (Q) is multiplied with $-g\cos(\omega_0 t+\emptyset)$ and this is modeled by mixers 523 and 525. The parameter g represents a gain imbalance and Ø represents a phase imbalance. The parameters $a_1$ and $a_2$ represent dc offsets in I and Q paths which can be modeled as adders 531 and 533. Once these four parameters are determined or estimated, the quadrature compensator corrects them as indicted in the narrowband quadrature compensator block 531 wherein the adders 533 and 535 compensate the DC offset imbalance and the gain element 537 and the phase shift element 539 compensate the amplitude and phase imbalances.

Figure 5C:
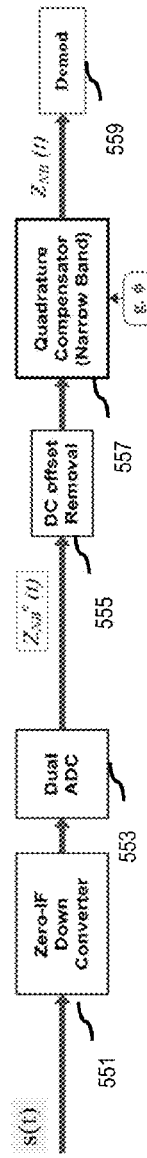

FIG. 5C depicts the overall process wherein a zero-IF down converter 551 is followed by a dual ADC 553. In the next step DC offset removal and narrowband quadrature compensation are performed digitally (e.g., by software or otherwise) at elements 555 and 557. Possibly a demodulation block 559 might follow.

The degree of imbalance removal depends on the accuracy of estimation of dc offsets, and gain and phase imbalance.

This does not address issues related to a wideband channel/carrier or a multicarrier receiver.

By contrast, the receiver design described here, according to various embodiments addresses issues related to a narrowband single channel/carrier, a wideband channel/carrier, and multi-channel carrier scenarios. It also provides corrections for the temperature related variations over a large frequency range. Thus, this compensation approach of wideband quadrature and flatness correction over operational temperature range is applicable to, e.g., a single narrowband carrier receiver, a single wideband carrier receiver, a multi carrier receiver with pre-defined carrier spacing, a multi-carrier receiver with arbitrary (no pre-defined) carrier spacing, a receiver with wide input frequency range, a wideband frequency conversion to desired intermediate frequency, a continuous mode or burst mode, single or multi-channel/carrier receiver, improved performance due to flatness compensation for all of the above cases, improved performance due to temperature compensation for all of the mentioned cases.

FIG. 6A displays a wideband—multicarrier receiver 600 with non-ideal components. The RF wideband multicarrier input signal s (t) 601 is the input to the receiver. The imbalances in the receiver may be represented by, first, an amplitude and a phase imbalance at quadrature multiplier module 603 which includes a local oscillator (LO) 605 and, second by a wideband imbalance represented by the frequency response $H_Q(f)$ 607.

More specifically the modeling of the wideband quadrature imbalance can be performed as follows. In reference to FIG. 6A, the in-phase path (I) 609 is multiplied with $\cos(\omega_0 t)$ while the quadrature path (Q) 611 is multiplied with $-g\cos(\omega_0 t+\emptyset)$. The parameter g represents a gain imbalance and $\emptyset$ a phase imbalance at the local oscillator (LO) frequency. Additionally, as mentioned above, a function $H_Q(f)$ 607 (in frequency domain) or its time-domain representation $H_Q(t-\tau)$ symbolizes the wideband imbalance resulting from the mismatches (e.g., due to the imbalance in the responses of the I and Q LPFs 613 and 615, respectively). The parameters $a_1$ and $a_2$ represent dc offsets in I and Q paths. The parameters $a_1$, $a_2$, g, $\emptyset$, and $H_Q(t)$ can be determined using offline receiver calibration.

It is mentioned that (due to non-idealities) in the receiver 600, the resultant image suppression can be very poor and can significantly degrade performance, as shown in FIG. 6B, which illustrates the frequency spectrum s(f) of the wideband multicarrier input (top plot) and the significant image residual after non-ideal direct down-conversion (bottom plot). Here, the input signal s(f) is assumed to be at carrier $f_0$ with bandwidth WB. When the spectrum at $f_0 \pm WB/2$ is down-converted with non-ideal components, due to the imbalances of amplitude and phase at and/or about $f_0$ the down-converted spectrum suffers from cross-talk between I and Q path.

According to certain embodiments the calibration for measuring the quadrature receiver mismatch (imbalance) parameters involves injecting multiple equal amplitude tones within the frequency range $(f_0-WB/2, f_0+WB/2)$ and collecting their samples (e.g., at the output of the ADCs 617 and 619). The spectrum of the samples can then be used to get measurement of the mismatch parameters at the tone frequencies using the following equations:

Gain imbalance:

$$g(f)_{dB} = 20\log_{10}\left(\frac{|Q_{tone}(f)|}{|I_{tone}(f)|}\right), \quad F_o - WB/2 < f < F_o + WB/2$$

Phase imbalance:

$$\emptyset(f) = -\pi/2 - \arg(Q_{tone}(f)) - \arg(I_{tone}(f)), \quad F_o - WB/2 < f < F_o + WB/2$$

FIG. 6B and 6C, respectively, show (in terms of frequency) the gain and phase imbalance characterization of one such receiver with a bandwidth, WB, of 125 MHz. The gain and phase imbalance plots show the imbalance of the Q path with respect to the I path. It is observed that: (1) the wideband imbalance is asymmetric around the band center and has a non-zero offset at the band center, which can be attributed to the LO gain imbalance g, and the asymmetric nature of the wideband imbalance can be attributed to the filter amplitude mismatch; and (2) the phase imbalance has a non-zero offset at the band center, which can be attributed to the LO phase imbalance, and the variation of the phase can be attributed to the filter phase mis-match.

This response can be modeled using a complex FIR filter $H_Q(f)$. Therefore, a complex quadrature imbalance correction filter can be designed for the Q path which has a $H_Q(f)^{-1}$ response:

$$H_{QC}(f) = H_{QC,i}(f) + jH_{QC,q}(f) = \frac{1}{H_Q(f)}$$

In some embodiments the filter coefficients may be generated using the following procedure:

1. Collect M gain imbalance, g(k), and phase imbalance $\emptyset(k)$, where k=0,1, 2, ..., M−1 and imbalance measurements are for LO frequency $f_0$ over the frequency range $[-F_S/2, F_S/2]$, where $F_S$ is the ADC sampling frequency. Here, g(k) may be in decibels and $\emptyset(k)$ in degrees (other units are possible).

2. Linearly interpolate the gain and phase imbalance measurements to have N equally spaced gain imbalance, $g_L(k)$, and phase imbalance, $\emptyset_L(k)$.

3. The frequency response of the quadrature imbalance may be written as $$H_Q(k) = 10^{g_L(k)/20}\exp\left(i\phi_L(k)\frac{pi}{180}\right)$$

4. The IQ Imbalance equalizer's response will be $$H_{QC}(k) = \frac{1}{H_Q(k)}$$

5. Let h(n), n=0, 1, 2, .... N−1, be the N point inverse FFT of $H_{QC}(k)$. e(n) will be complex since the gain imbalance is not symmetrical about the band center.

$$e(n) = [e(0)\ e(1)\ \ldots\ e(N-1)]$$

$$e(n) = \left[e(0)\ e(1)\ \ldots\ e\left(\frac{M}{2}-1\right)\ e\left(N-\frac{M}{2}\right)\ \ldots\ e(N-2)\ e(N-1)\right]$$

6. Make the sequence e(n) causal by delaying it by M/2 samples $$e_c(n) = \left[ e\left(N - \frac{M}{2}\right) \ldots e(N-2)\ e(N-1)\ e(0)\ e(1) \ldots e\left(\frac{M}{2} - 1\right) \right]$$

7. Use a window, with r=0.35, to window $e_c(n)$ (e.g., a Tukey window). If w(n), n=0, 1, 2, ..., M−1, are the samples of the window, then the impulse response of the equalizer is given by:

$$h_{QC}(n) = h_{QC,i}(n) + j\ h_{QC,q}(n) = e_{T,c}(n),\ w(n)$$

Figure 7A:
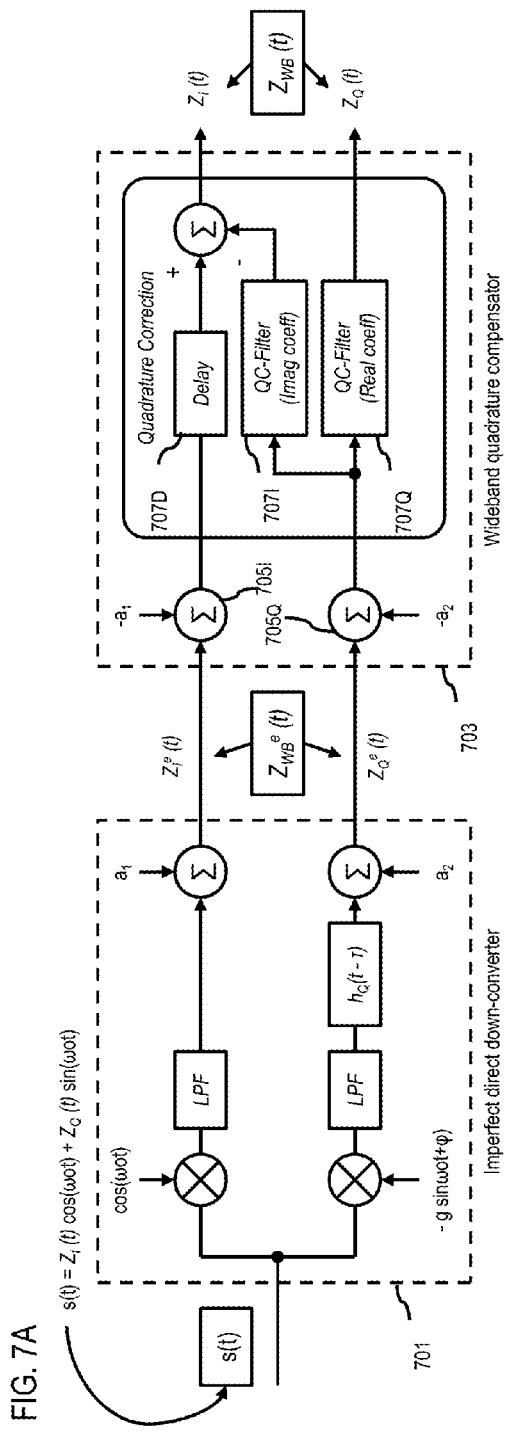
FIGS. 7A-7B illustrate an architecture for the wideband quadrature compensator capable of removing the imbalances and its effect on the signal components, according to various embodiments.
Figure 7B:
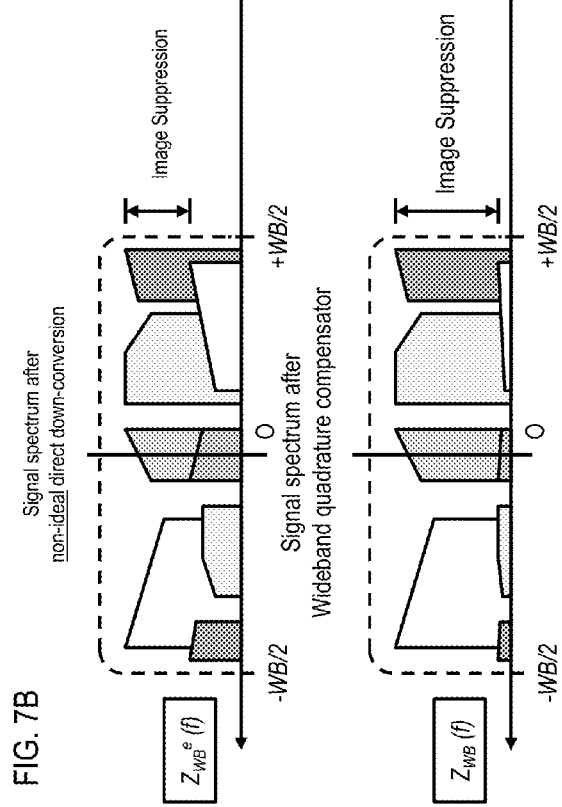

The quadrature down-converter and compensation (correction) block in FIG. 7A show the application of the filter for correcting IQ Imbalance in the imperfect or non-ideal quadrature direct down-converter block 701. In the wideband quadrature compensator 703, the DC offsets in the I and Q branches are corrected by DC offset compensators 705I and 705Q according to the determined DC offsets $a_1$ and $a_2$, respectively. An N-tap FIR filter 707I with coefficients $h_{QC,i}(n)$ can be applied to the Q path, whereas an N-tap FIR 707Q with coefficients $h_{QC,q}(n)$ can be applied to the Q-to-I cross-coupled path. The I path will have a delay 707D corresponding to the delay introduced by the N-tap FIR filters as depicted. Once the dc offsets and the Quadrature Correction coefficients are determined from the test data, the wideband quadrature compensator 703 provides an appropriate correction. This correction process in some embodiments may be implemented by digital logic in the FPGA or a Digital Signal Processor (DSP). The resultant image suppression is improved considerably over the entire band as shown in FIG. 7B. It is contemplated that other topologies for the quadrature compensator 703 are possible, for example, one wherein the FIR filters are applied to the I and Q branches while the addition is applied to the Q branch (instead of the I branch as in FIG. 7A).

Figure 8:
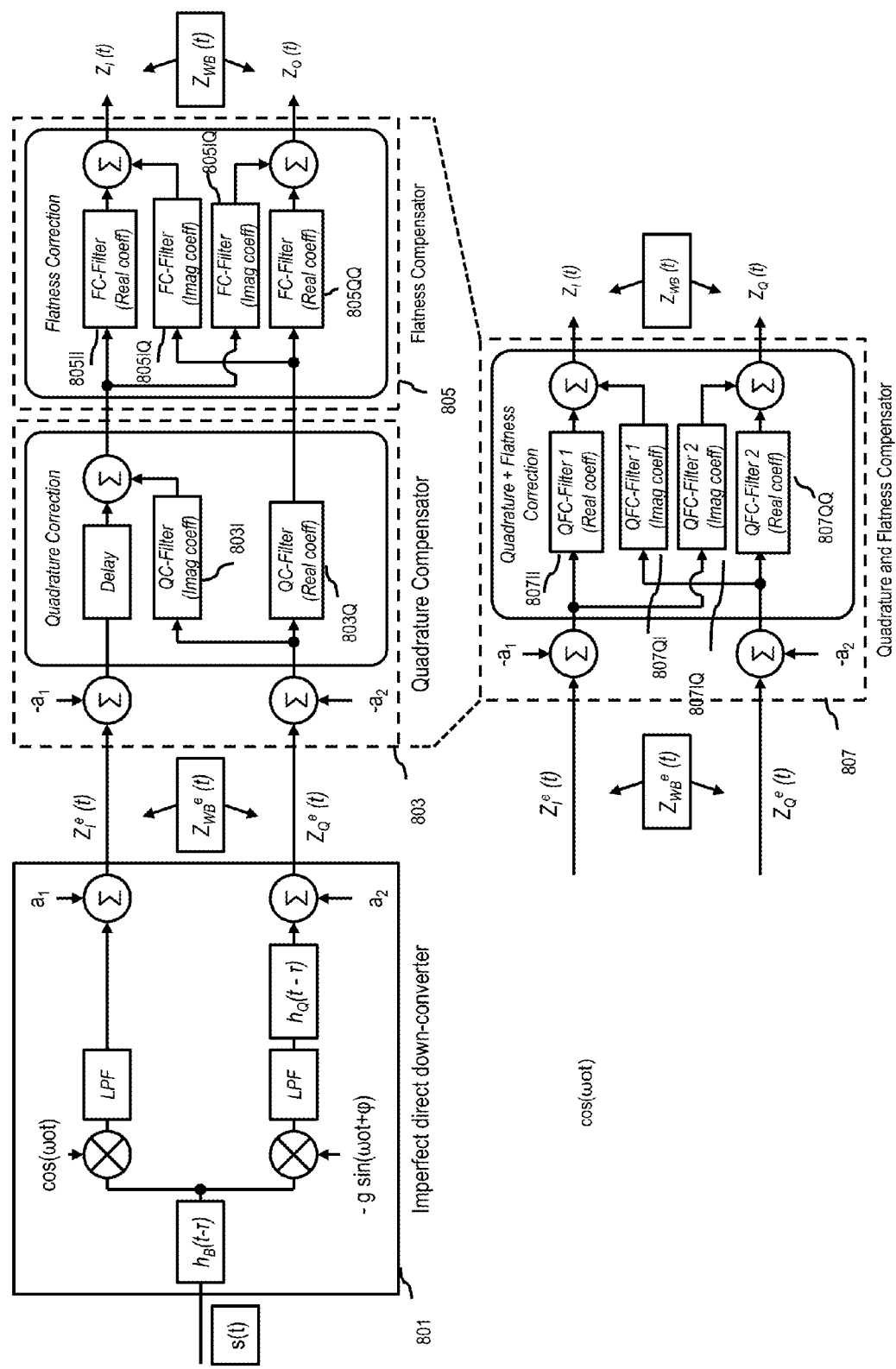
FIG. 8 illustrates a combined implementation of the wideband quadrature compensator and the wideband flatness compensator, according to one embodiment.

Additionally, in some embodiments, design may incorporate RF flatness correction. The non-flatness characteristic of the receiver, $H_B(f)$, is determined using offline calibration test. Calibration test for measuring the receiver's RF flatness involves injecting multiple equal level tones within the frequency range ($f_0$−WB/2, $f_0$+WB/2) and recording the level of the reference path (I path) signal at the output of the ADC. The spectrum, $H_B(f)$, will be asymmetric around the band center since the RF path introduces RF frequency dependent attenuation to the signal. A N-tap complex FIR filter, $h_{FC,i}(n)+h_{FC,q}(n)$, can be determined whose spectrum has the inverse amplitude response of the measured flatness impairment. This filter will follow the Quadrature correction filter as shown in FIG. 8.

Moreover, in some embodiments the Quadrature correction and the RF flatness correction filter coefficients can be combined into a N-tap complex filter with coefficients $h_{QFC-1,i}(n)+jh_{QFC-1,q}(n)$ for the I path, and coefficients $h_{QFC-2,i}(n)+jh_{QFC-2,q}(n)$ for the Q path. These coefficients can be derived from the Quadrature correction and the RF flatness correction filter coefficients as under:

$$h_{QFC-1,i}(n) = h_{FC,i}(n)$$

$$h_{QFC-2,q}(n) = h_{FC,q}(n)$$

$$h_{QFC-2,i}(n) = h_{QC,i}(n) * h_{FC,i}(n) - h_{QC,q}(n) * h_{FC,q}(n)$$

$$h_{QFC-2,q}(n) = h_{QC,q}(n) * h_{FC,i}(n) - h_{QC,i}(n) * h_{FC,q}(n)$$

The combined quadrature and flatness compensator filter reduces complexity and overall computation need as depicted in FIG. 8. The quadrature imbalance in the I/Q components of the quadrature down-converter block 801 is compensated by the wideband quadrature compensator 803 which includes two FIR filters 803I and 803Q. The flatness compensator 805 which includes four FIR filters 805QQ, 805QI, 805IQ, and 805II compensates the wideband non-flatness in the I/Q branches. By combining the two compensators, advantageously reduced computation can be achieved e.g., in the combined quadrature and flatness compensator 807 only 4 FIR filters are employed. The output of the combined quadrature and flatness compensator 807 provides clean signal that has flat response across wide bandwidth (WB) and diminished interference due to excellent image suppression. Thus, the signal quality is greatly improved. In certain embodiments this signal may be used by a channelizer and demodulators as in FIG. 11B below, which shows a multi-channel/carrier receiver wideband quadrature and flatness compensation according to some embodiments. Hence, the architecture shown in FIG. 11 B results in better performance of the receiver e.g., in terms of lower error rate and lower packet loss.

According to certain embodiments the enhanced RF receiver is capable of operating in a wide temperature and frequency range. FIG. 9 illustrates the process of determining wideband compensators across a wide temperature range or a plurality of frequency bands. In step 901, a non-ideality parameter or pattern (e.g., quadrature imbalance or non-flatness parameter or pattern) at a given a temperature or a given frequency band is determined. In step 903, non-ideality parameters over a temperature range or a plurality of frequency bands are determined at least based on the non-ideality parameter at the given temperature or the given frequency band. This is performed e.g., according to what was mentioned above. In step 905, corresponding to each determined non-ideality parameter a plurality of compensation parameters (e.g., coefficients of FIR coefficients) are determined for compensating the non-ideality. For example, based on the quadrature imbalance parameter at a given temperature or at a given frequency band a quadrature compensator (e.g., in the form of FIR filter) is determined according to the processes explained earlier. The same can be performed for flatness compensator at a given temperature or a given frequency band. In step 907, the compensation parameters determined over a temperature range or a plurality of frequency bands are stored in a memory unit. In step 909, based on the operating temperature or frequency band of the receiver an appropriate compensation parameter is loaded. Therefore, embodiments of this invention realize enhanced wideband RF receivers operating over a wide temperature and frequency range (e.g., in the case of multichannel or multicarrier RF receivers).

Figure 10A:
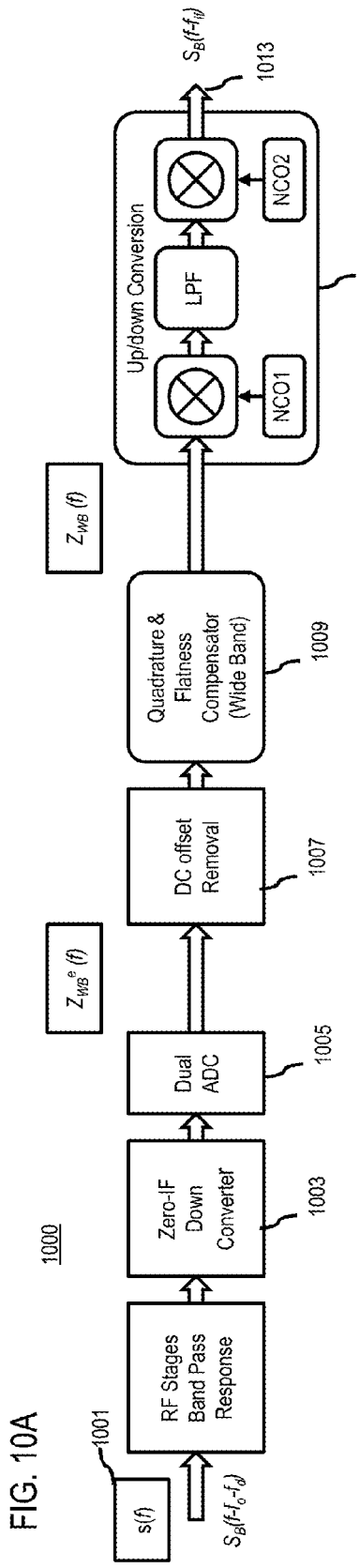
FIGS. 10A-10B illustrate a RF receiver employing the wideband quadrature and flatness compensator, wherein the output signal is modulated to arbitrary frequency by an up/down-converter.

In certain embodiments, a specific frequency band of the spectrum $Z_{WB}(f)$ can also be selected and up/down converted to different frequency spectrum. For example, FIG. 10A illustrates an RF receiver 1000 further configured as a high fidelity frequency down/up converter module according to some embodiments. The receiver 1000 receives a wideband RF input signal 1001 centered at $f_0$ where the portion or sub-band of the signal around $f_0+f_d$ is of interest (denoted by $S_B(f-f_0-f_d)$) to be further down/up converted.

Figure 10B:
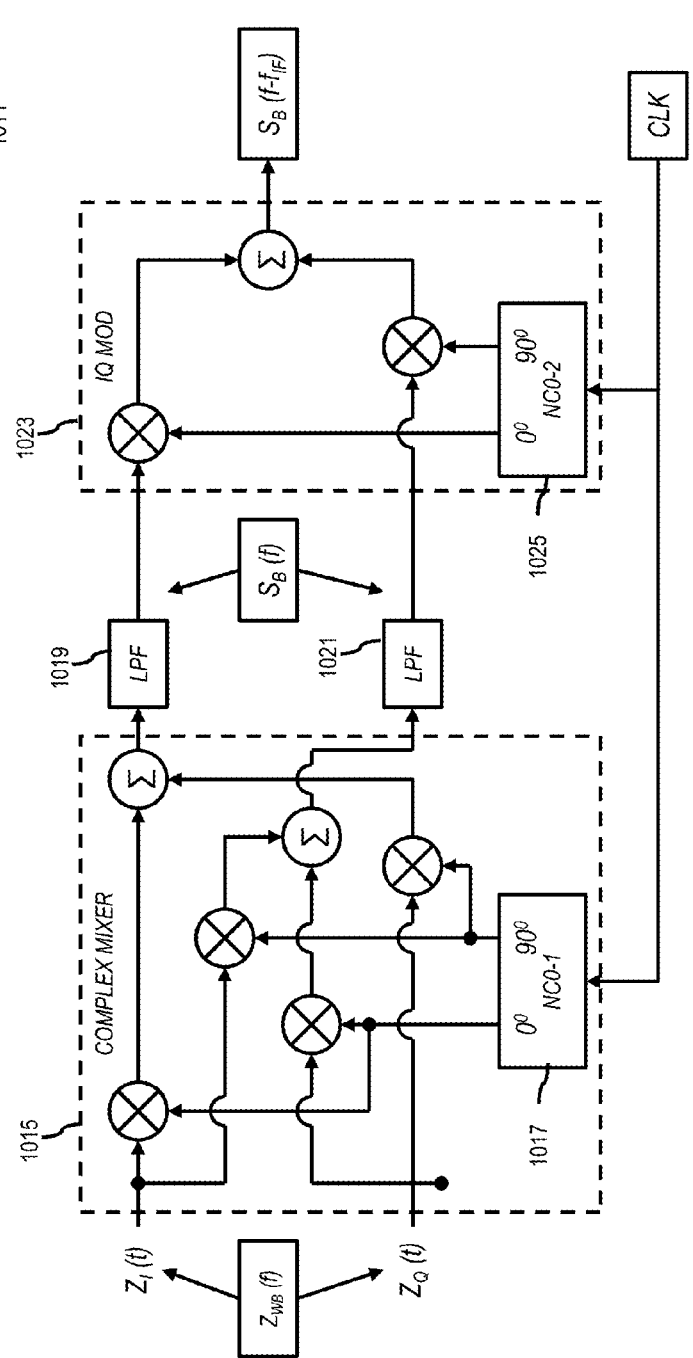

According to some embodiments, the receiver 1000 may include along with standard components such as zero-IF down-converter 1003, ADC 1005, and DC offset removal block 1007, a wideband quadrature and flatness compensation 1009 and frequency conversion block 1011. Initially, the input signal (centered at $f_0$) is down-converted to based band by the down-converter 1003 and compensated by for DC offset and wideband quadrature imbalances by the compensators 1003 and 1005, respectively, as described earlier. Next, in the frequency conversion block 1011 initially the sub-band centered at $f_d$ is (digitally) down-converted to baseband and low-pass filtered and then up-converted to frequency $f_{1f}$. Hence, ultimately the output signal 1013 is a portion of input signal around $f_0+f_d$ now centered at frequency $f_{1f}$. The detailed architecture for such frequency band selection and up/down conversion block 1011, according to some embodiments, is shown in FIG. 10B. According to some embodiments, the up/down conversion block 1011 may include a digital complex mixer 1015 which itself may include a numerically controlled oscillator (NCO) 1017. The mixer 1015 may be tuned to perform the first down conversion from $f_d$ to baseband. Further, the low-pass filters 1019 and 1021 filter out unwanted images and finally the IQ modular 1023 up converts the baseband signal to frequency $f_{1f}$ which may be tuned via the NCO 1025.

Typically, down converters use all-analog processing, and thus, can be bulky and expensive. However, the architecture in FIG. 10B provides a small form factor and a low-cost approach to frequency down conversion. FIG. 10C illustrates overall processing of down converting spectral band located at $f_0+f_d$ to $f_{1f}$ resulting in high fidelity arbitrary frequency down conversion, as described above. This approach also employs a frequency band selection using offset tuning that alleviates any issue related to dc offset in the path. Its digital filtering offers superior performance in terms of in-band flatness and out-of-band rejection.

The preceding design can deal with a large operational frequency range and temperature. As depicted in FIG. 10D, it divides the frequency range in to N bands (N not to be confused with the N taps of the FIR filters). The divided segments can be overlapping or non-overlapping. The test data is collected for each band segment for a several specific temperature settings within the operational temperature range. The quadrature flatness compensation (QFC) coefficients are computed from the data and are stored in the non-volatile memory of the unit. The operational software selects an appropriate set of QFC coefficients based on the band segment and the operating temperature.

Figure 11A:
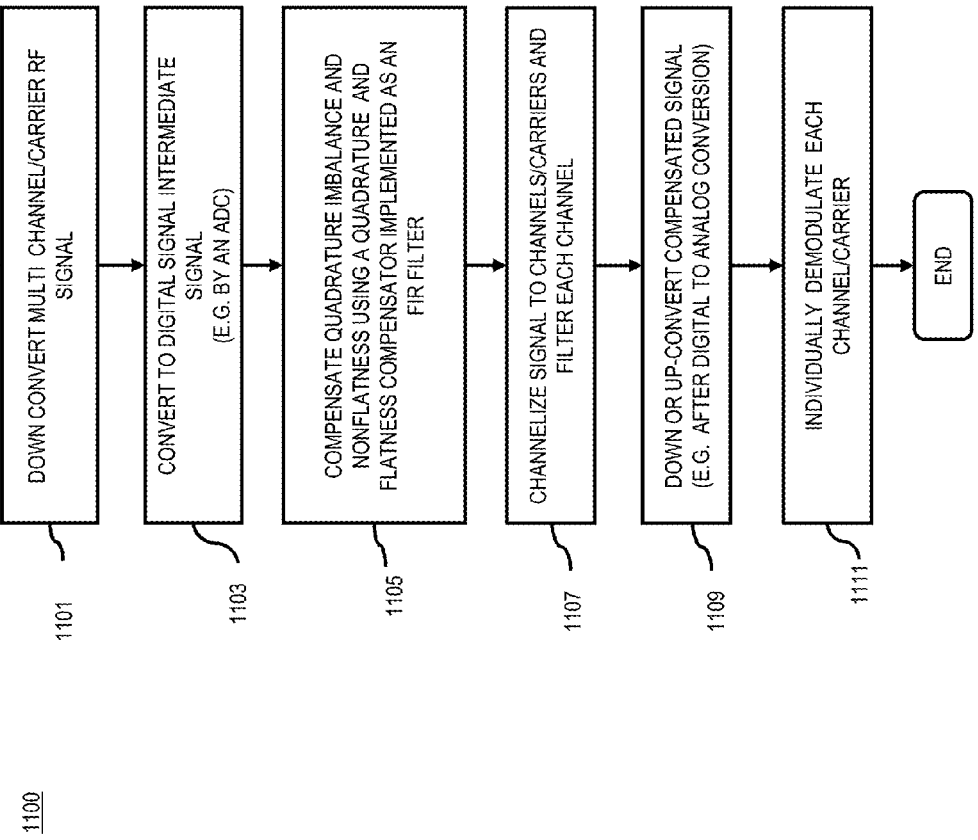
FIG. 11A is a flowchart of a process for receiving and demodulating a multichannel/multicarrier RF signal employing a multi-carrier multi-channel RF zero-IF receiver employing the wideband quadrature compensator and the flatness compensator, according to certain embodiments.

In certain embodiments after the quadrature correction is performed, a channelizer may be employed to separate various channels/carriers and send them to appropriate demodulators. FIG. 11A illustrates a general process for receiving multicarrier/multichannel RF signals according to some embodiments. In step 1101, a received RF signal is down-converted to preferably a baseband signal or more generally a pass-band intermediate signal. In step 1103, the intermediate signal is converted preferably to a digital intermediate signal (e.g., using an Analog to Digital Converter (ADC)). In step 1105, the (digital) intermediate signal or each channel or carrier within the intermediate signal is compensated for wideband quadrate imbalance and/or wideband flatness using a quadrature compensator and/or a wideband flatness compensator determined according to the various methods discussed earlier. According to some embodiments, combined FIR filters may be used to implement both the compensators (for example as in FIG. 8). According to some embodiments based on the channel/carrier or the operating temperature an FIR filter is used. For example, the compensation may be performed at each frequency band separately and the compensator may depend on the operating temperature. In step 1107, according to some embodiments, the compensated signal $Z_{WB}(t)$ may be passed through a channelizer to separate the multi-channel or multi-carrier compensated signal $Z_{WB}(t)$ into channels or carriers. In some embodiments the channelization may be performed in analog domain after the compensated signal is converted back to an analog signal. In this step further band-pass filtering may be applied. In step 1109, a down conversion or up-conversion may be performed at each channel or carrier. In step 1111 each channel or carrier is demodulated separately. Since the up or down conversion may be applied with freedom, this wideband quadrature and flatness correction process allows unrestricted channel/carrier placement.

Figure 11B:
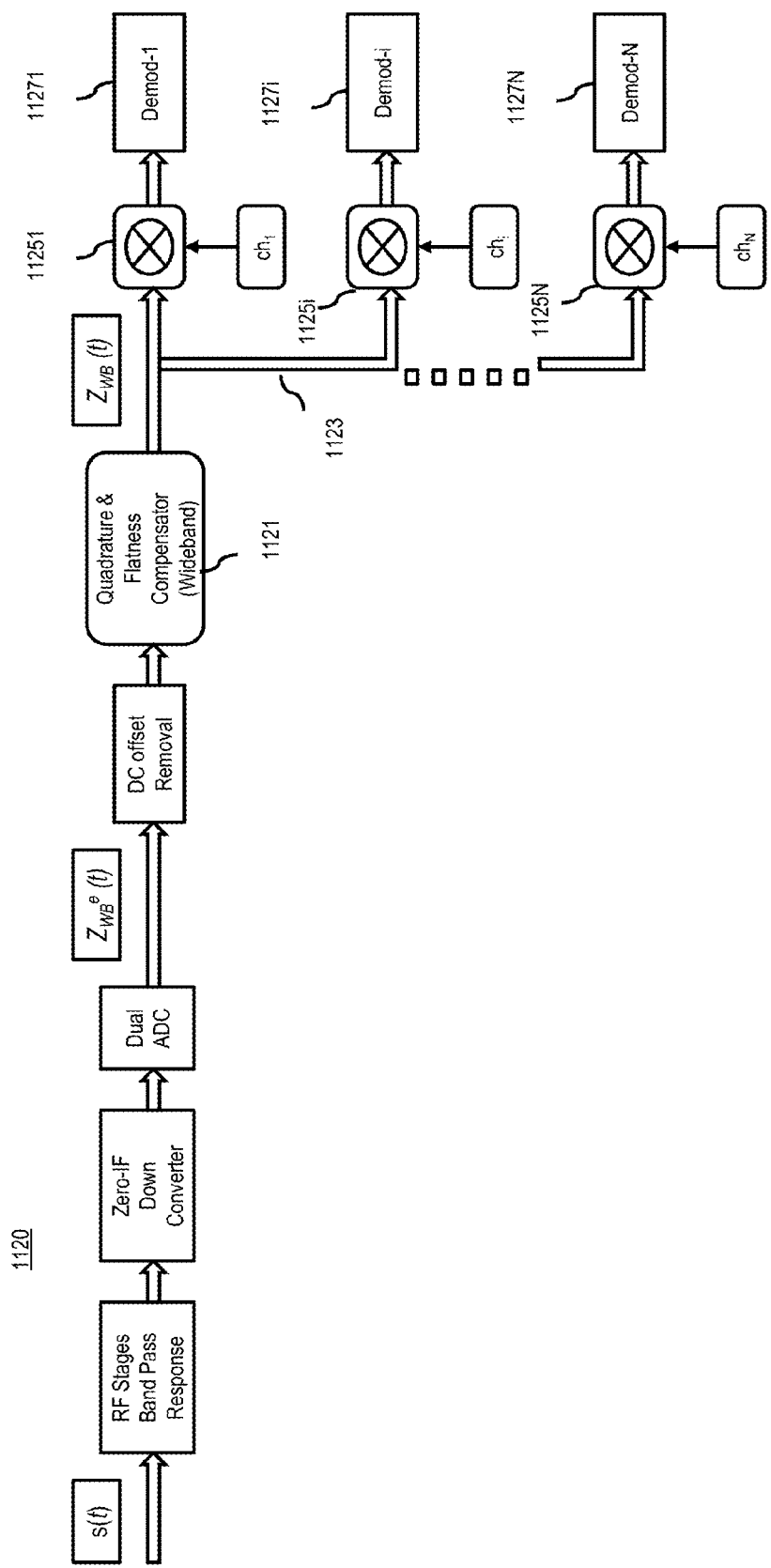
FIG. 11B illustrates a corresponding receiver according to some embodiments.

FIG. 11B illustrates a receiver capable of receiving and demodulating an RF signal comprised of N frequency bands, channels or carriers as in FIG. 10D, according to some embodiments. In certain embodiments the N frequency bands might be overlapping. Each band may have a different modulation and the corresponding carriers may be arbitrarily related. The wideband quadrature and flatness compensator 1121 is followed by channelizer 1123, which separates the N channels/carriers in the signal in FIG. 10B. In certain embodiments, the compensator 1121 may comprise N quadrature and flatness compensators each operating at a corresponding frequency band. Furthermore, it is contemplated more flexibility in terms of operating temperature can be achieved by using respective compensators for different operating temperatures. The required compensation parameters may be determined according to various methods explained above (e.g., as in FIG. 9). Moreover, each channel can be then down converted (or up converted) separately and subsequently demodulated as depicted in FIG. 11B. It is contemplated that converters 1125$i$ or the demodulators 1127$i$ may be implemented in various forms e.g., either in analog domain or digital domain via software or hardware or combinations thereof. Furthermore, it is appreciated that such an architecture advantageously allows for unrestricted carrier or channels through out a large frequency range with enhanced reception performance. In particular, software implementation allows to getting rid of existing bulky analog circuitry.

Certain embodiments of this system has been tested, and herein the test results are briefly summarized to confirm the above mentioned functions and advantages. The quadrature imbalance and flatness impairment introduced by the receiver is characterized over the receiver bandwidth, WB, of 125 MHz centered carrier frequency, $f_0$, of 1687.5 MHz. An input test signal includes multiple continuous wave (CW) tones of equal magnitude and spread over the 125 MHz band is used to measure the imbalance and distortion introduced by the zero-IF receiver. The measurement is performed by capturing the signal samples after the Analog-to-Digital convertor and offline processing the signal.

Figure 12J:
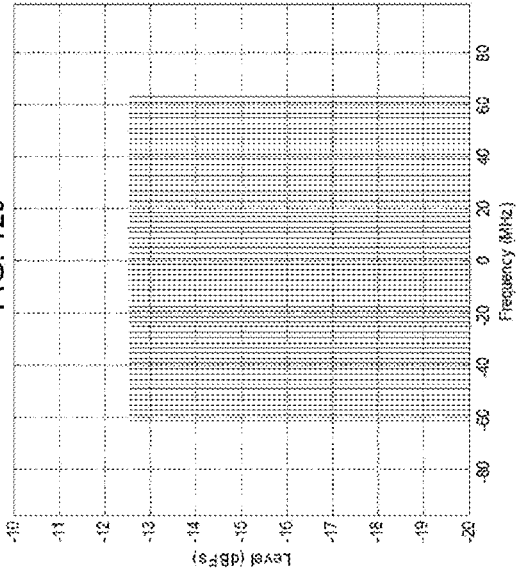
FIGS. 12A-12N illustrate test performance of an enhanced zero-IF RF receiver according to an embodiment.
Figure 12I:
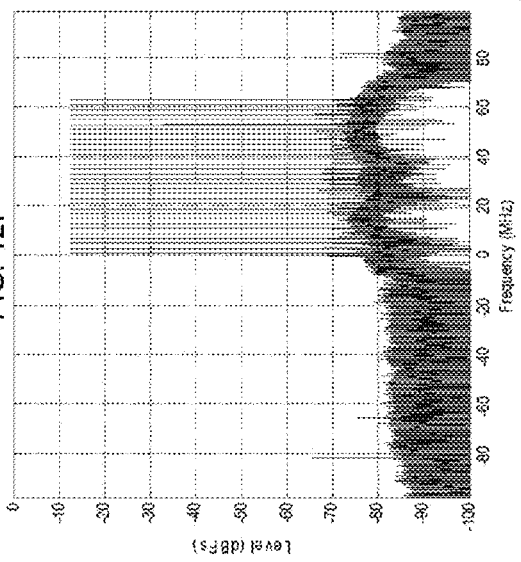
Figure 12K:
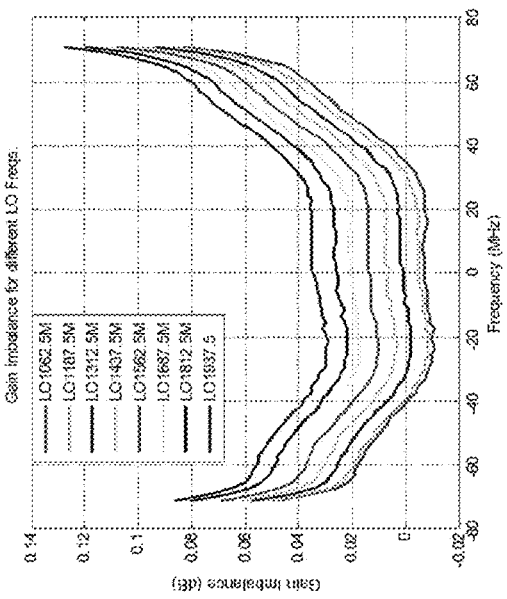
Figure 12M:
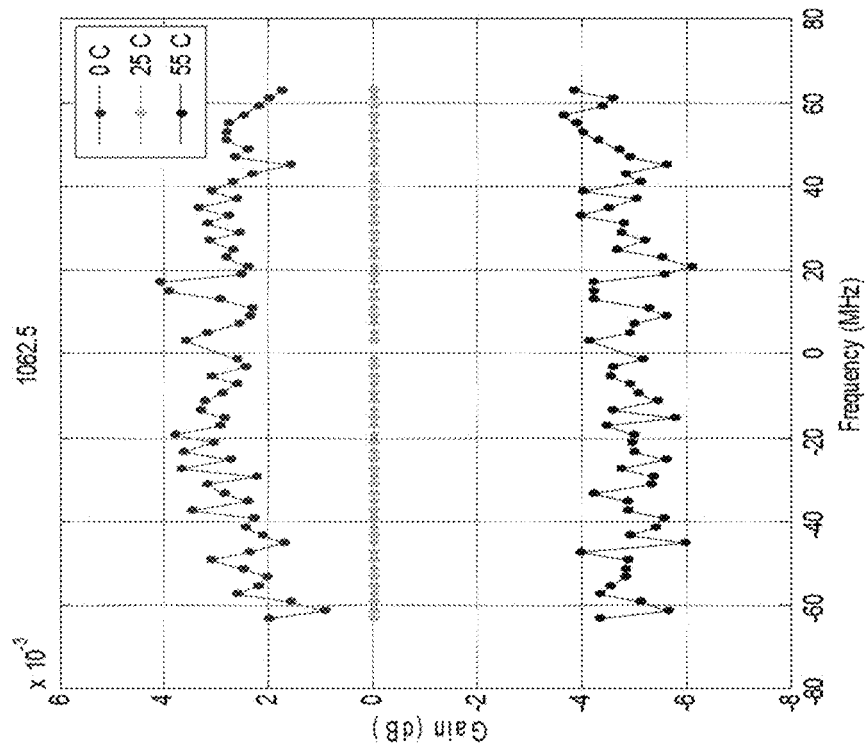
Figure 12L:
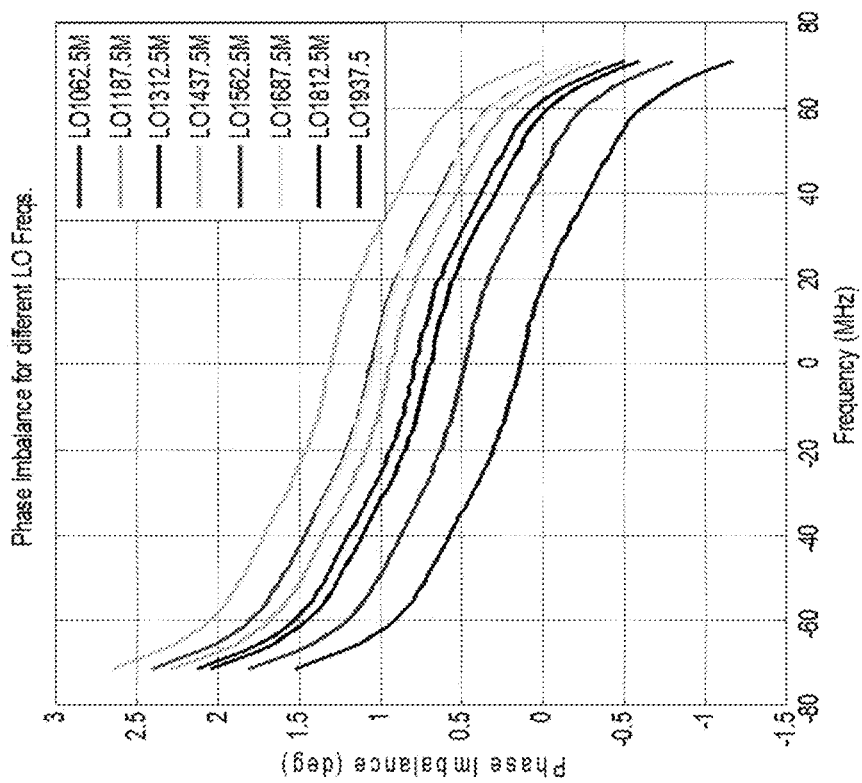
Figure 12N:
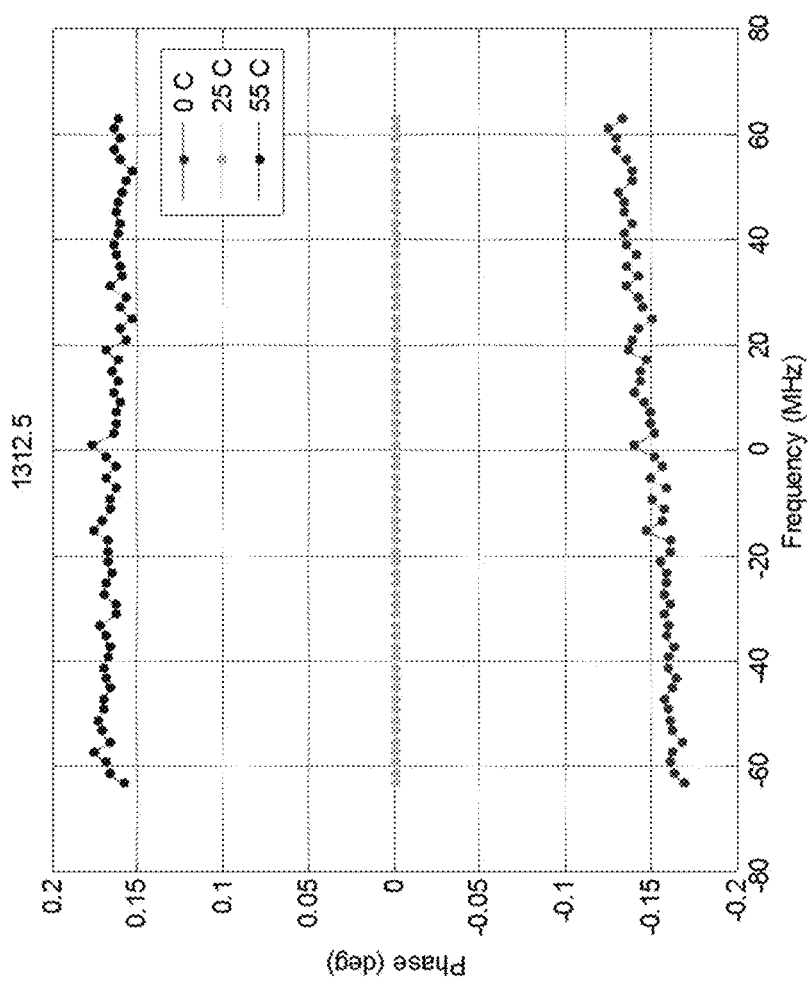

By way of example, a receiver, according to certain embodiments, exhibits one or more of the characteristics shown in FIGS. 12A-12N. Specifically, FIGS. 12AError! Reference source not found. and 12B show the measured gain and phase imbalance of the Q path with reference to I path, respectively. Under certain embodiments, the gain imbalance and phase imbalance are as high as 0.07 dB and 2 degrees respectively.

Because of the imbalance, the presence of the signal in the receiver's upper-side band introduces unwanted image signal in the lower side-band, and vice-versa. FIG. 12C shows the multi-carrier signal in the lower side band and its image because of the IQ imbalance, while FIG. 12D illustrates the multi-carrier signal in the upper side-band and its image because of IQ imbalance. The flatness impairment introduced by the zero-IF receiver over the 125 MHz band is shown in FIG. 12E. There is a variation of about 1 dB across the received channel band of 125 MHz. After correcting the multi-carrier signal using the Quadrature and Flatness compensator, the residual gain and phase imbalance, as shown in FIGS. 12F and 12G, if any insignificant, respectively. The image frequencies which were as high as 35 dBc before equalization are now sufficiently suppressed by more than 60 dBc as shown in FIGS. 12H and 12I. Specifically FIG. 12H shows multi-carrier signal in the lower side band and its image after compensation. FIG. 12I depicts a scenario involving a multi-carrier signal in the lower side band and its image after compensation. Additionally, FIG. 12J shows the multi-carrier signal flatness after correction, which is shown to be sufficiently flat with a peak residual slope of less than 0.1 dB.

The gain and phase imbalance can be characterized for different operational LO frequencies and different operating temperatures. The gain and phase imbalance across the 125 MHz band is shown in FIG. 12K and FIG. 12L for different LO frequencies at an ambient temperature of 25° C.

FIG. 12M and FIG. 12N show the gain and phase imbalance for different temperatures from 0° C. to 55° C. normalized to 25° C. temperature data for the LO frequency of 1062.5 MHz.

From FIGS. 12K-N, the certain general observations can be made. Gain and phase imbalance have more or less the same variations across the zero-IF receiver bandwidth band but depending on the LO setting they are at different offsets from each other—where, the different offsets in the gain and phase imbalance are because the LO introduces a fixed gain and phase imbalance when set to a specific center frequency. Further, the imbalance variation across the receiver band is caused by the low pass filters in the I/Q demodulator and is not affected by the receiver center frequency. Additionally, change in ambient temperature has insignificant change in the gain imbalance over the entire band. There is some variation in the phase imbalance but it can be considered to be insignificant because IRR greater than 60 dB can still be achieved even with this variation in the phase imbalance. From these general observations, test data repeatability can be exploited over frequency bands and temperature. This results in reducing numbers of tests and the test time, whereby: (1) only one calibration measurement is required for different LO frequencies after the imbalance over the entire receiver band is characterized for any one of the LO frequency; and (2) only one calibration measurement is required for different operating temperature after the imbalance over the entire receiver band is characterized for any one of operating temperature.

The processes described herein for providing a zero-IF receiver in which the quadrature imbalances are compensated by a wideband quadrature compensator may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
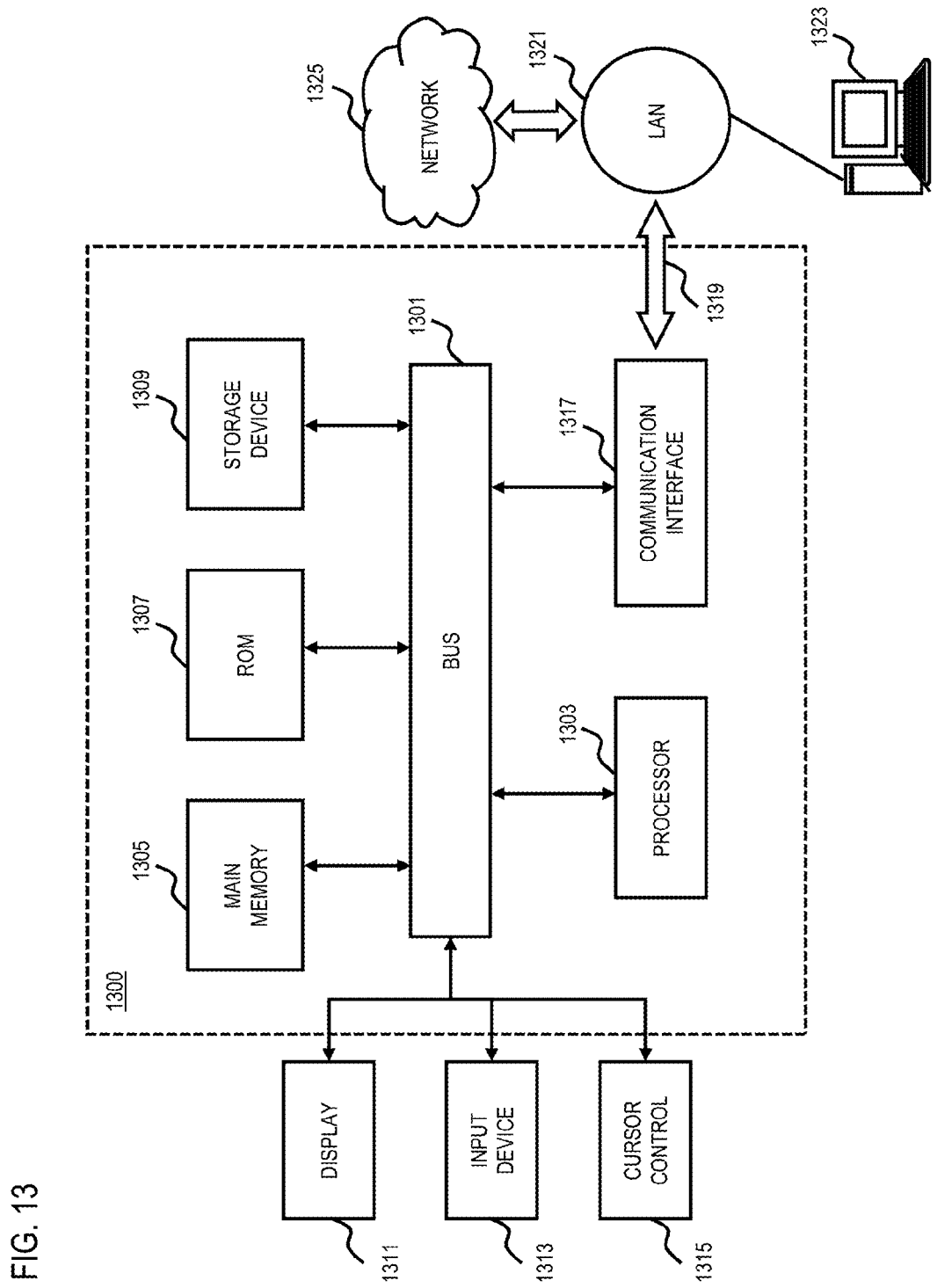
FIG. 13 illustrates a computer system upon which certain embodiments can be implemented.

FIG. 13 illustrates a computer system upon which exemplary embodiments according to the present invention can be implemented. The computer system 1300 includes a bus 1301 or other communication mechanism for communicating information, and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions to be executed by the processor 1303. The computer system 1300 further includes a read only memory (ROM) 1307 or other static storage device coupled to the bus 1301 for storing static information and instructions for the processor 1303. A storage device 1309, such as a magnetic disk or optical disk, is additionally coupled to the bus 1301 for storing information and instructions.

The computer system 1300 is coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is cursor control 1315, such as a mouse, a trackball, or cursor direction keys for communicating direction information and command selections to the processor 1303 and for controlling cursor movement on the display 1311.

According to one embodiment of the invention, dynamic and flexible architectures and methods for association of remote nodes with respective aggregation nodes, in accordance with exemplary embodiments, are provided by the computer system 1300 in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry is used in place of or in combination with software instructions to implement the embodiment of the present invention. Thus, embodiments of the present invention are not limited to any specific combination of hardware circuitry and software.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, or a telephone modem to provide a data communication connection to a corresponding type of telephone line. As another example, communication interface 1317 may be a local area network (LAN) card (e.g. for EthernetTM or an Asynchronous Transfer Mode (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317, for example, includes peripheral interface devices, such as a Universal Serial Bus (USB) interface, a PCMCIA (Personal Computer Memory Card International Association) interface, etc.

The network link 1319 typically provides data communication through one or more networks to other data devices. For example, the network link 1319 provides a connection through local network 1321 to a host computer 1323, which has connectivity to a network 1325 (e.g. a wide area network (WAN) or the global packet data communication network now commonly referred to as the "Internet") or to data equipment operated by service provider. The local network 1321 and network 1325 both use electrical, electromagnetic, or optical signals to convey information and instructions. The signals through the various networks and the signals on network link 1319 and through communication interface 1317, which communicate digital data with computer system 1300, are exemplary forms of carrier waves bearing the information and instructions.

The computer system 1300 sends messages and receives data, including program code, through the network(s), network link 1319, and communication interface 1317. In the Internet example, a server (not shown) might transmit requested code belonging to an application program for implementing an embodiment of the present invention through the network 1325, local network 1321 and communication interface 1317. The processor 1303 executes the transmitted code while being received and/or store the code in storage device 1309, or other non-volatile storage for later execution. In this manner, computer system 1300 obtains application code in the form of a carrier wave.

The term "computer-readable medium" as used herein refers to any medium that participates in providing instructions to the processor 1303 for execution. Such a medium may take many forms, including but not limited to non-volatile media, volatile media, and transmission media. Non-volatile media include, for example, optical or magnetic disks, such as storage device 1309. Volatile media may include dynamic memory, such as main memory 1305. Transmission media may include coaxial cables, copper wire and fiber optics, including the wires that comprise bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 14:
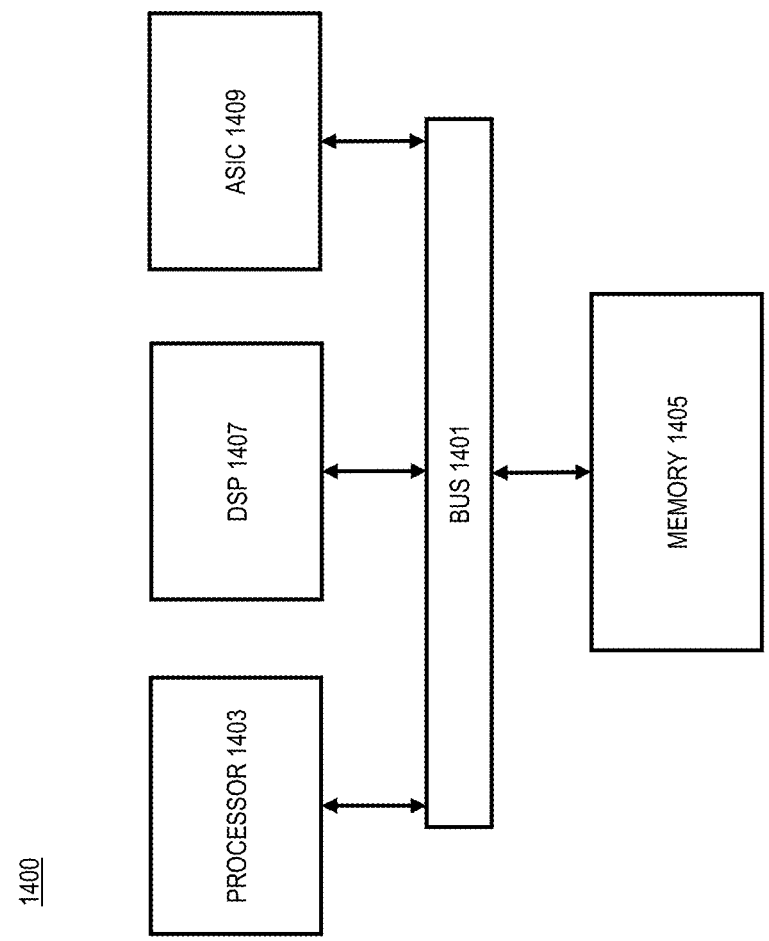
FIG. 14 is a diagram of a chip set that can be utilized in implementing an enhanced zero-IF RF receiver, according to various embodiments.

FIG. 14 illustrates a chip set 1400 in which embodiments of the invention may be implemented. Chip set 1400 includes, for instance, processor and memory components described with respect to FIG. 14 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 includes one or more processing cores with each core configured to perform independently. A multi-core processor enables multiprocessing within a single physical package. Examples of a multi-core processor include two, four, eight, or greater numbers of processing cores. Alternatively or in addition, the processor 803 includes one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, and/or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM) and static memory (e.g., ROM) for storing executable instructions that, when executed by the processor 1403 and/or the DSP 1407 and/or the ASIC 1409, perform the process of exemplary embodiments as described herein. The memory 1405 also stores the data associated with or generated by the execution of the process.

Figure 15:
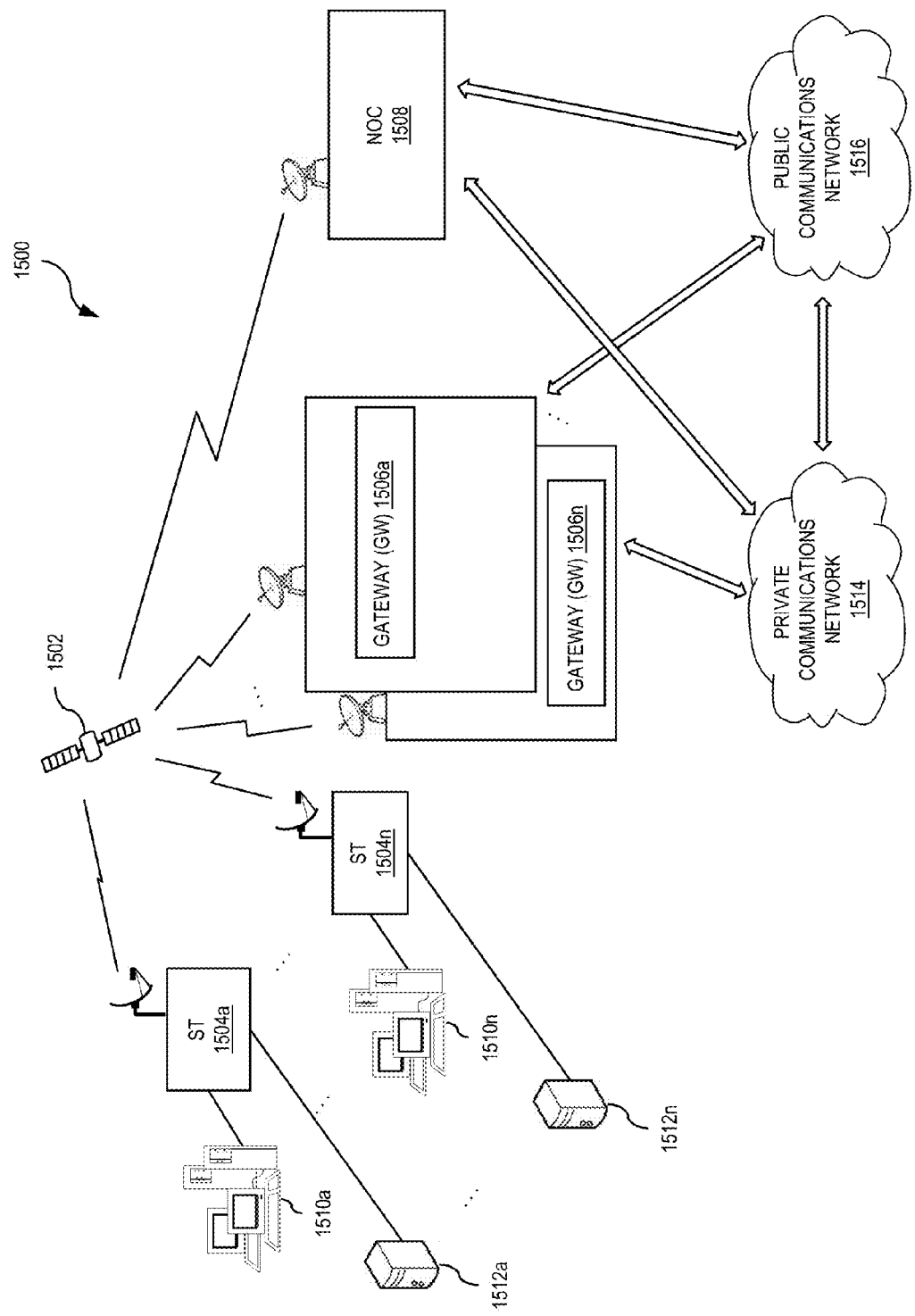
FIG. 15 illustrates a broadband satellite communication capable of employing different embodiments of the receiver design.

FIG. 15 illustrates an exemplary satellite communications system 1500 capable of supporting communications among terminals with varied capabilities and employing the zero-IF RF receivers, according to exemplary embodiments. Satellite communications system 1500 includes a satellite 1502 that supports communications among multiple satellite terminals (STs) 1504*a*-1504*n*, a number of gateways (GWs) 1506*a*-1506*n*, and a network operations center (NOC) 1508. The STs 1504*a*-1504*n* provide connectivity to one or more hosts 1510*a*-1510*n* and/or routers 1512*a*-1512*n*, respectively. According to some embodiments, the NOC 1508 may reside at a separate site reachable via a separate satellite channel or may reside within a GW site. The NOC 1508 performs the management plane functions of the system 1500, while the GWs 1506*a*-1506*n* perform the data plane functions of the system 1500. For example, the NOC 1508 performs such functions as network management and configuration, software downloads (e.g., to the STs 1504*a*-1504*n*), status monitoring, statistics functions (e.g., collection, aggregation and reporting), security functions (e.g., key generation, management and distribution), ST registration and authentication, and GW diversity management. The NOC 1508 communicates with each GW via the satellite 1502, or via a secure private communications network 1514 (e.g., an IPsec tunnel over a dedicated link or a virtual private network (VPN) or IPsec tunnel through a public network 1516, such as the Internet). It is contemplated that various embodiments of this invention may be employed in various parts (involved in wired or wireless communication) of this system e.g., the satellite 1502, STs 1504a-1504n, GWs 1506a-1506n, NOC 1508, hosts 1510a-1510n, routers 1512a-1512n or the networks 1514 and 1516.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

What is claimed is:

1. A method comprising:
    injecting a first set of tone signals into an RF receiver, wherein the first set of tone signals are within a frequency band of the RF receiver;
    down-converting the first set of tone signals, and measuring I and Q components of the down-converted tone signals;
    determining one or more imbalance characteristics based on the measured I and Q components of the down-converted first set of tone signals;
    determining one or more imbalance compensation parameters based on the determined imbalance characteristic(s), wherein the imbalance compensation parameter(s) are formulated for correction of imbalances in I and Q components resulting from down-conversion of RF signals by the RF receiver;
    injecting a second set of tone signals into the RF receiver, wherein the second set of tone signals are within the frequency band of the RF receiver;
    down-converting the second set of tone signals, and measuring I and Q components of the down-converted tone signals;
    determining one or more flatness characteristics based on the measured I and Q components of the down-converted second set of tone signals;
    determining a flatness compensation model based on the determined flatness characteristic(s), wherein the flatness compensation model is formulated for applying a flatness correction to the I and Q components of the down-converted RF signals.

2. The method according to claim 1, further comprising:
    receiving an input RF signal;
    down-converting the received input RF signal and generating resulting I and Q components of the RF signal; and
    performing an imbalance correction on the resulting I and Q components of the down-converted the RF signal based on the imbalance compensation parameters.

3. The method according to claim 2, further comprising:
    applying a flatness correction to the resulting I and Q components of the down-converted the RF signal based on the flatness compensation model.

4. The method according to claim 1, further comprising:
    determining one or more DC offset parameters based on the measured I and Q components of the down-converted tone signals, wherein the DC offset parameter(s) are formulated to correct for DC offset of the I and Q components resulting from the down-conversion of RF signals by the RF receiver.

5. The method according to claim 4, further comprising:
    receiving an input RF signal;
    down-converting the received input RF signal and generating resulting I and Q components of the RF signal;
    performing an imbalance correction of the resulting I and Q components of the down-converted the RF signal based on the imbalance compensation parameters; and
    applying a DC offset to the resulting I and Q components of the down-converted the RF signal based on the DC offset parameter(s).

6. The method according to claim 5, further comprising:
    applying a flatness correction to the resulting I and Q components of the down-converted the RF signal based on the flatness compensation model.

7. The method according to claim 1, wherein the determination of the imbalance compensation parameters comprises formulating filter coefficients for a filter to reflect an inverse of the imbalance characteristics.

8. The method according to claim 7, wherein the filter is configured as one or more finite impulse response (FIR) filters.

9. The method according to claim 1, wherein the determination of the flatness compensation model comprises formulating coefficients for a filter to generate a spectrum that reflects an inverse of the flatness characteristic(s).

10. The method according to claim 9, wherein the filter is configured as one or more finite impulse response (FIR) filters.

11. An apparatus comprising:
    a quadrature down-converter configured to down-convert an input RF signal to generate resulting I and Q components of the RF signal;
    a wideband quadrature compensator configured to compensate for imbalances in the I and Q components of the down-converted RF signal based on one or more imbalance compensation parameters; and
    a wideband flatness compensator configured to apply a flatness correction to the I and Q components of the down-converted RF signal based on a flatness compensation model; and
    wherein the one or more imbalance compensation parameters are formulated based on one or more determined imbalance characteristics, wherein the imbalance characteristic(s) are based on measured I and Q components resulting from a down-conversion of a first set of tone signals by the quadrature down-converter; and
    wherein the flatness compensation model is formulated based on one or more flatness characteristics, wherein the flatness characteristic(s) are based on measured I and Q components resulting from a down-conversion of a second set of tone signals by the quadrature down-converter.

12. The apparatus according to claim 10, further comprising:
    a DC offset compensator configured to compensate for DC offsets in the I and Q components of the down-converted RF signal based on one or more DC offset parameters, wherein the DC offset parameter(s) are formulated based on the measured I and Q components of the down-converted tone signals.

13. The apparatus according to claim 12, wherein:
    the DC offset compensator comprises a DC offset compensator located within each of an I-branch output and a Q-branch output of the quadrature down-converter, wherein each of the I-branch and Q-branch DC offset compensators is configured to compensate for DC offsets in the respective I and Q components of the down-converted RF signal based on the DC offset parameters for the respective I-branch or Q-branch; and the wideband quadrature compensator comprises a Q-branch filter located within the Q-branch configured with Q-filter coefficients, a Q/I-branch filter located within a Q-to-I cross-coupled branch from the Q-branch to the I-branch, and a delay device located within the I-branch, wherein the Q-branch and the Q/I-branch filters are each configured with filter coefficients based on respective ones of the imbalance compensation parameters to model an inverse of the imbalance characteristic(s), and the delay device is configured to compensate for a delay corresponding to the Q-branch and the Q/I-branch filters.

14. The apparatus according to claim 12, wherein:

the DC offset compensator comprises a DC offset compensator located within each of an I-branch output and a Q-branch output of the quadrature down-converter, wherein each of the I-branch and Q-branch DC offset compensators is configured to compensate for DC offsets in the respective I and Q components of the down-converted RF signal based on the DC offset parameters for the respective I-branch or Q-branch; and the wideband quadrature compensator comprises an I-branch filter located within the I-branch configured with I-filter coefficients, an I/Q-branch filter located within an I-to-Q cross-coupled branch from the I-branch to the Q-branch, and a delay device located within the Q-branch, wherein the I-branch and the I/Q-branch filters are each configured with filter coefficients based on respective ones of the imbalance compensation parameters to model an inverse of the imbalance characteristic(s), and the delay device is configured to compensate for a delay corresponding to the I-branch and the I/Q-branch filters.

15. The apparatus according to claim 11, wherein the wideband quadrature compensator comprises a filter configured to model an inverse of the imbalance characteristic(s).

16. The apparatus according to claim 15, wherein the filter comprises one or more finite impulse response (FIR) filters.

17. The apparatus according to claim 11, wherein the wideband flatness compensator comprises a filter with a spectrum that reflects an inverse of the flatness characteristics.

18. The apparatus according to claim 17, wherein the filter comprises one or more finite impulse response (FIR) filters.

19. An RF receiver comprising:

an input configured to receive an input RF signal;

one or more bandpass filters configured to attenuate out of band signals from the RF signal;

one or more of a linear RF amplifier configured to apply a linear amplification to the RF signal and an automatic gain controller configured to provide a controlled amplitude signal based on the RF signal;

a quadrature down-converter configured to down-convert the RF signal to generate resulting I and Q components of the RF signal;

a wideband quadrature compensator configured to compensate for imbalances in the I and Q components of the down-converted RF signal based on one or more imbalance compensation parameters; and a wideband flatness compensator configured to apply a flatness correction to the I and Q components of the down-converted RF signal based on a flatness compensation model; and wherein the imbalance compensation parameter(s) are formulated based on one or more determined imbalance characteristics, wherein the imbalance characteristic(s) are based on measured I and Q components resulting from a down-conversion of a first set of tone signals by the quadrature down-converter, and wherein the first set of tone signals are within a frequency band of the RF receiver; and wherein the flatness compensation model is formulated based on one or more flatness characteristics, wherein the flatness characteristic(s) are based on measured I and Q components resulting from a down-conversion of a second set of tone signals by the quadrature down-converter, and wherein the second set of tone signals are within the frequency band of the RF receiver.

* * * * *